United States Patent [19]

Ford

[11] Patent Number: 5,786,815

[45] Date of Patent: Jul. 28, 1998

[54] CONFIGURABLE RUNTIME GRAPHICAL USER INTERFACE WIDGET MANAGEMENT

[75] Inventor: David M. Ford, Los Gatos, Calif.

[73] Assignee: Sun Microsystems, Inc., Palo Alto, Calif.

[21] Appl. No.: 656,587

[22] Filed: May 31, 1996

[51] Int. Cl.$^6$ .................................... G06F 3/00
[52] U.S. Cl. ............................. 345/333; 395/701
[58] Field of Search .................. 395/333, 334, 395/701; 345/333, 342, 334, 339, 967

[56] References Cited

U.S. PATENT DOCUMENTS

| | | | |
|---|---|---|---|
| 5,301,270 | 4/1994 | Steinberg et al. | 345/326 |
| 5,495,567 | 2/1996 | Iizawa et al. | 345/334 |
| 5,600,780 | 2/1997 | Hiraga et al. | |
| 5,603,034 | 2/1997 | Swanson | 395/701 |
| 5,652,884 | 7/1997 | Palevich | 395/651 |

OTHER PUBLICATIONS

Rudolf, J., et al, "Completing the Job of Interface Design", IEEE Software, v.9, N. 6, 1992, pp. 11–22.

"Method to provided customization of an application user interface by an end user", IB14–TDB, v. 31, n.1, Jun. 1988, pp. 337–338.

Carl, M., "Designing with Sun's Devguide," UNIX Today, 26 Nov. 1990, p. 36.

Volger, J., "The UIM/X GUI Builder," UNIX News, Sep. 1994, p. 37.

Open Software Foundation, *OSF/Motif*™ *Programmer's Guide*, release 2.0, Prentice Hall, Chapter 4, pp. 4–1 through 4–22, 1995.

Dan Heller, et al., *Motif Programming Manual*, 2nd edition, O'Reilly & Associates, Inc., Chapters 22–26, pp. 761–909, 1994.

Sun Microsystems, Inc., *Workshop: Visual User's Guide*, Revision A, Chapters 1, 2, and 7, pp. 1–52 and 219–262, Dec. 1996.

Borland International, Inc., *ObjectVision –Getting Started Manual*, 1991.

Borland International, Inc., *ObjectVision –Reference Guide*, 1991.

*Primary Examiner*—A. Katbab
*Attorney, Agent, or Firm*—Townsend and Townsend and Crew LLP

[57] ABSTRACT

A method facilitating modification of an application's graphical user interface (GUI), particularly by application end-users. In particular, the method permits modification of the application GUI, without having to specify widgets required for the modified GUI, and without having to modify or add callback routines. Thus, users can tailor the application GUI to suit their needs without having experience in GUI development (and, in particular, with the cumbersome and error-prone tasks of widget-specification and callback programming). Elimination of the need to modify/expand the set of callback routines permits end-users to realize application GUI changes without having to form a new application executable. Thus, user-driven application GUI changes can be achieved without user access to the application source code and without the application developer's involvement.

40 Claims, 6 Drawing Sheets

CONFIGURABLE RUNTIME GRAPHICAL USER INTERFACE WIDGET MANAGEMENT

BACKGROUND OF THE INVENTION

The present invention relates to computer systems, and more particularly to graphical user interfaces.

As a result of the growing popularity of graphical user interfaces (GUIs) for computer programs, various tools have been created to facilitate the process of developing a GUI for an application. Typically, the process of using such a tool includes the following steps:

1) creating a user-editable text file (e.g. a user interface language (UIL) file) specifying the graphical elements (also known as "widgets", e.g. a text field, button, menu, list, or scroll bar) required for the desired GUI, either directly or through graphical means using a GUI-builder;

2) compiling the text file into an internal format such as a user interface database (UID) file. This internal format is accessed during execution of the application;

3) programming various routines of the application that access the internal format of 2) and are responsible for widget creation and management. These routines typically call a set of high-level routines for widget creation and management (e.g. the Motif library, which in turn calls low-level routines, e.g. the Xlib routines provided by the X Windows System). Some of these routines, known as "callback routines", are executed upon the occurrence of various user interactions with the widgets created in (1). For example, there could be a callback routine that is executed whenever the user enters a value into a particular text field.

4) creating an executable module ("binary") for the application that includes the compiled callback routines and calls to high-level routines.

Sometimes, users require modification to the application GUI at some time(s) after shipment of the application to the user. In the case where an application GUI allows creation and/or modification of instances of various types of entities (e.g. UNIX shell commands), a modification to the GUI might be required because of external changes to the entities. For example, a GUI for an application that allows the construction by the user of a valid operating system command might need to be modified in order to reflect a newly expanded command set (or option set for existing commands) supported by the operating system in which the user intends to run the constructed commands. Changes to the GUI typically require 1) changes to the user-editable file (e.g. UIL file) which specifies the widgets required for the GUI and 2) new or altered callback routines.

Most modifications to an application's GUI will require changes/additions to the application source code (i.e. the callback routines). However, the application source code, for various commercial reasons, is rarely provided to users. Thus, user-driven modifications to the application GUI typically can only be obtained through a request to the application developer for a new executable (object module) incorporating the callback routine additions/changes required to implement the desired modification to the GUI. In addition, even if the application source code is available to the user, realization of a desired GUI modification can be problematic given that most users have no experience in GUI development. Particular sources of difficulty arise in 1) specifying a type, name, location, callback routine name, parent widget etc. for each required widget either by text entry or through a GUI-builder, and 2) writing callback routines which task requires knowledge of a particular library of widget creation/management routines such as Motif or XWindows. Indeed, specifying widgets and programming callback routines are cumbersome tasks even for application developers. For this reason, frequently an application is released with a GUI that reflects only a subset of the underlying functionality of the application.

What is needed is a technique to realize changes to an application GUI that does not require programming of callback routines or specification of the widgets required for the desired GUI. In particular, a GUI-modifying technique that can be easily performed by application users, who do not have access to the source code and who do not have experience in GUI development, would be desirable.

SUMMARY OF THE INVENTION

A method facilitating specification of an application's graphical user interface (GUI), particularly by application end-users, is disclosed. The method permits modification of the application GUI, without specifying widgets required for the modified GUI, and without modifying or adding callback routines. Thus, users can tailor the application GUI to suit their needs without having experience in GUI development. In particular, the method does not require user knowledge of the cumbersome and error-prone tasks of widget-specification and callback programming. Elimination of the need to modify/expand the set of callback routines permits end-users to realize application GUI changes without having to form a new application executable. Thus, user-driven application GUI changes can be achieved without user access to the application source code and without the application developer's involvement.

A technique is disclosed for specifying the GUI of an application that allows users to create or modify instances of one or more entities (UNIX shell commands in one embodiment). In particular, the desired GUI is specified by providing definitions for the entities rather than a widget-based description. The technique for specifying the application's GUI includes the steps of:

1) storing, in an input file, a first entity definition which defines the structure of a first entity (the input file can be edited to add or modify entity definitions);

2) creating a first graphical user interface corresponding to the first entity definition, wherein a user can create or modify instances of the first entity through the first graphical user interface.

DESCRIPTION OF THE PREFERRED EMBODIMENT

In one embodiment of the invention, an application provides a graphical user interface (GUI) which permits the user to construct valid shell commands for the UNIX operating system (e.g. compile and link commands). In particular, the application permits the user to enter input into windows that display the structure, i.e. arguments and options, associated with particular UNIX shell commands. Such an application is available as part of the AdaVision product 3.0, hereinafter "AdaVision", which is available from SUN Microsystems Inc. of Mountain View, Calif.

Figure 1A:
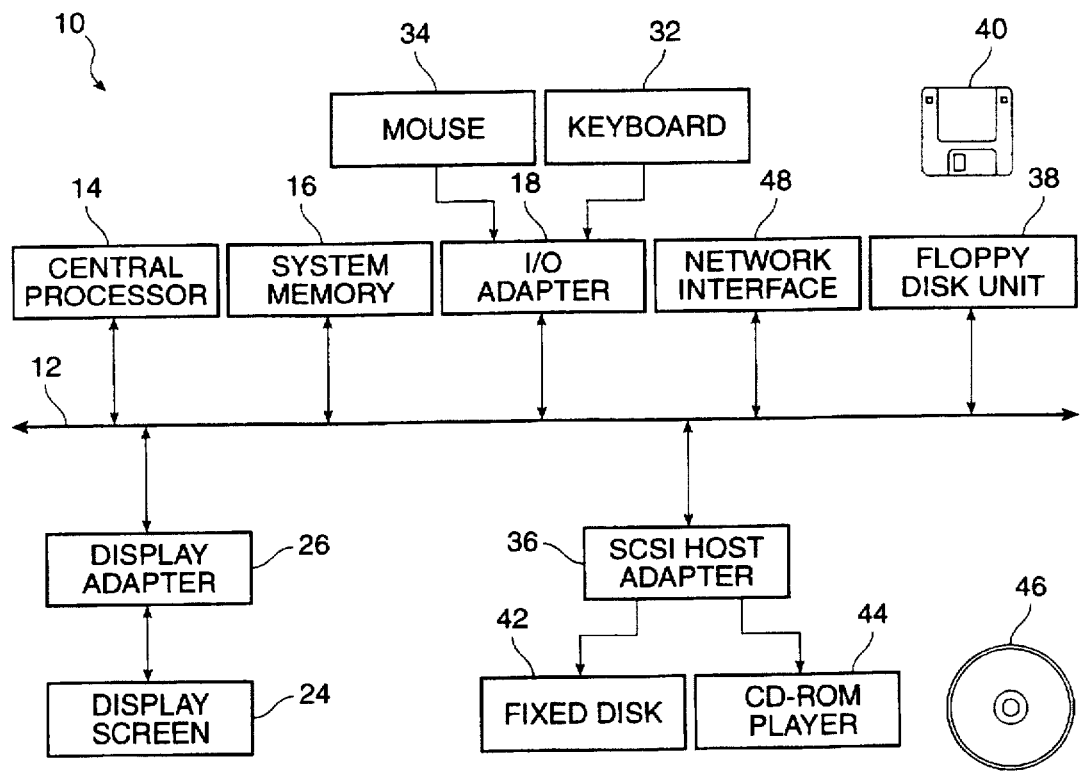
FIG. 1A depicts a block diagram of a computer system suitable for implementing the present invention.

FIG. 1A depicts a block diagram of a host computer system 10 suitable for implementing the present invention. Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32 and mouse 34 via I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 44 may be a part of host computer system 10 or may be separate and accessed through other interface systems. A network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as system memory 16, fixed disk 42, CD-ROM 46, or floppy disk 40.

Figure 1B:
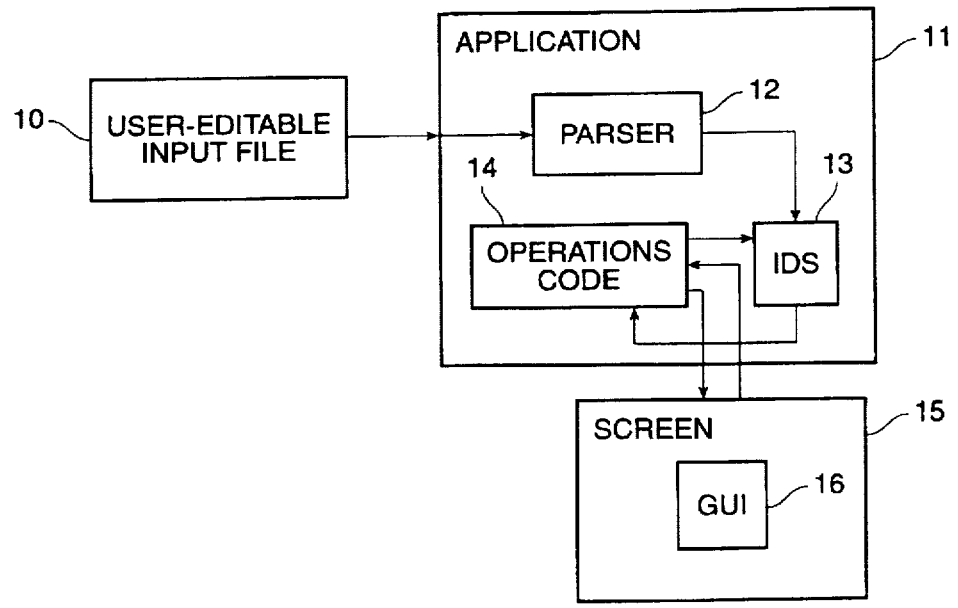
FIG. 1B depicts an overview of an embodiment of the invention.

FIG. 1B displays an overview of the functioning of an application of the type disclosed herein. A user-editable text file 10 (hereinafter the "input file") contains definitions of various UNIX shell commands (specifying command arguments, options, etc.). In AdaVision, the format of the command definitions is specified by a syntax described in Appendix 1. An application 11, contains a parser 12 which parses input file 10 to produce a corresponding internal format 13 (or internal data structure (IDS) 13) when application 11 starts to execute. Application 11, also contains operation code 14 that accesses IDS 13 and displays a GUI 16, corresponding to input file 10, on a computer screen 15.

The following is an example of the contents of an input file 10 that contains the definition (adhering to the command definition syntax of Appendix 1) of one command "a.example":

COMMAND a.example { <cmd_arg1>}

Figure 2:
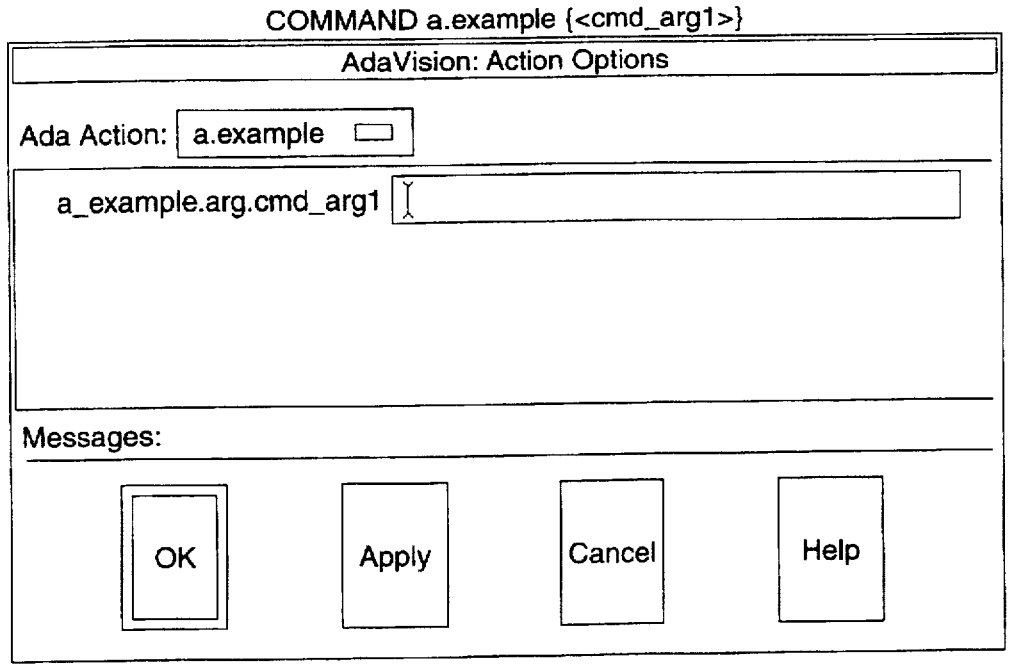
FIG. 2 depicts a GUI corresponding to a definition of a command with one argument and no options.

The command a.example contains one mandatory argument "cmdarg1" and no options. The space before the identifier "<cmd_arg1>" indicates that a space is to precede the argument in any command string constructed according to the definition. FIG. 2 depicts the GUI that application 11 would display given the above sample input file 10.

Suppose that the user intends to construct a UNIX shell command for a version of UNIX that supports a "–P" option for the command a.example with two nested optional option arguments. In order to cause application 11 to display a GUI that corresponds to this version of the command, the user could edit input file 10 to modify the definition of the "a.example" command to the following:

COMMAND a.example { <cmd_arg1>}

–P {[ <opt_arg1>[ <opt_arg2>]]}

Now, in addition to the mandatory command argument "cmd_arg1", the command contains an option "–P" that has an optional argument "opt_arg1" and, if argument "opt_arg1" is supplied, another optional argument "opt_arg2". The blanks before each of the three identifiers indicates that the corresponding command or option arguments is to be preceded by a space in a command string constructed according to the definition.

Figure 3:
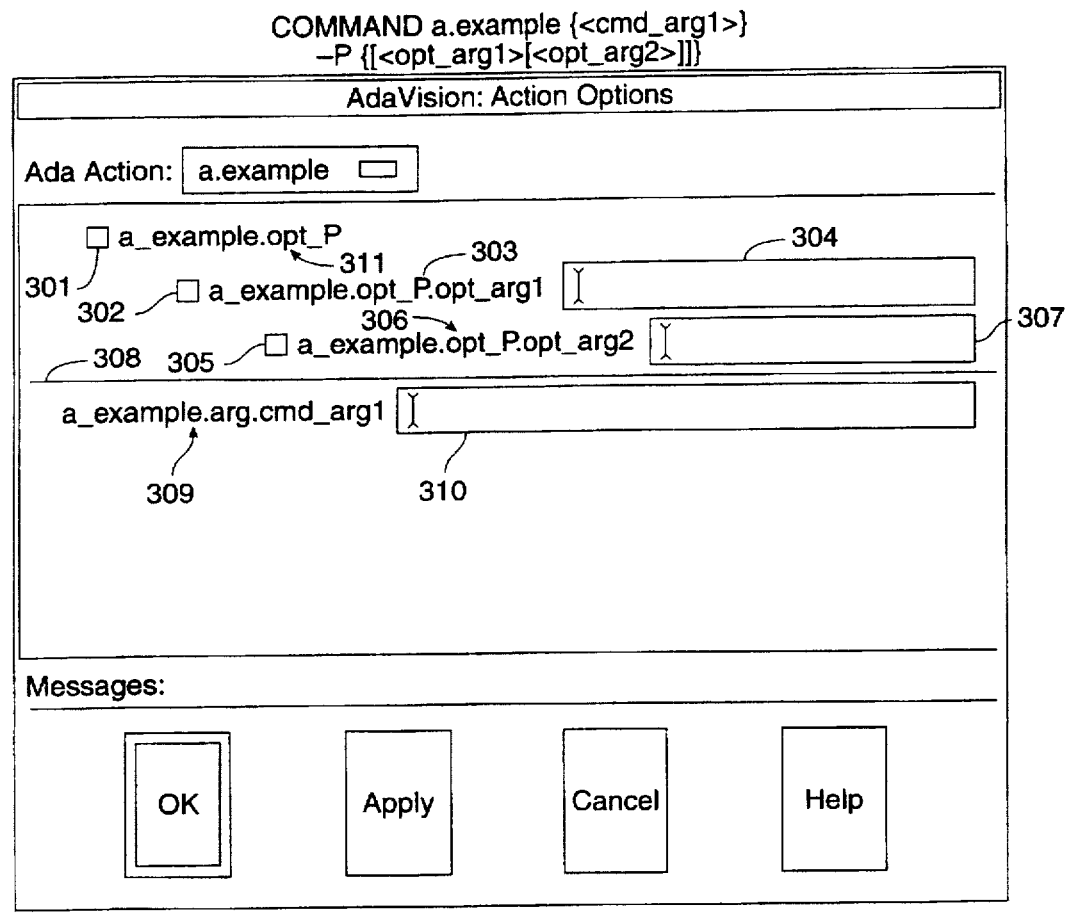
FIG. 3 depicts a GUI corresponding to a command definition formed by adding an option with two nested optional option arguments to the command definition corresponding to the GUI of FIG. 2.

FIG. 3 depicts the GUI that application 11 displays when started after the above modification to input file 10. Operations code 14 automatically creates the required widgets (i.e. text labels and text fields for command and option arguments, and associated checkboxes, with nesting, for the optional option arguments). Furthermore, the GUI's callback routines (which are part of application 11 and call functions contained in operations code 14 where the bulk of the actual callback processing is performed) do not need to be modified after a change to input file 10. For example, if the checkbox next to the text label "a_example.opt_P.opt_arg1" in the GUI of FIG. 2 is checked on, then the text field next to this text label and the checkbox next to the text label "a_example.opt_P.opt_arg2" will be activated by operations code 14. In AdaVision, operations code 14 does not directly create or manage widgets, but makes calls through an "Options_Callouts" interface for all required Motif/X functionality. The isolation of code directly interfacing with Motif and X Windows facilitates portability to widget creation/management systems other than X Windows or to X Windows toolkits other than Motif. The Options_Callout routines indirectly call Motif or X Windows via functions in the View.h++ library provided by Rogue Wave corporation.

Appropriate widget specification and callback processing can be performed by operations code 14 after a modification to input file 10 without modifying operations code 14. For this reason, creation of a new application executable can be avoided. This is possible because the callback routines of application 11 and the functions of operations code 14 have been designed in an entity-centered, as opposed to widget-centered, manner. In other words, these routines have been designed with knowledge of the format that is used to define the entities of interest to the user (in this embodiment, UNIX shell commands).

In particular, the internal format of the disclosed embodiment of the invention has been adapted to store the various features of command definitions (i.e. optionality, e.g. [arg1], nesting, e.g. [<arg1>[<arg2>]], repetition, e.g. [arg1]*, etc.). Each time the application executes, it first parses the input file into an equivalent internal format. The application's widget-specifying and callback processing routines have been designed to step through the internal format. In so doing, the routines access the command definition features stored in the internal format, in order to determine the appropriate widgets to be displayed and the appropriate callback processing to be performed. In this way, the application's widget-specifying and callback processing routines remain invariant regardless of changes to the command definitions stored in the input file.

On the other hand, prior art methods for GUI development (discussed in the background section) typically would require the user (or probably the application developer) to specify various characteristics (i.e. type, name, location, callback routine name, parent widget etc.) of each of the newly required widgets (e.g. text labels, text fields, nested checkboxes for the option "-P" and its arguments). This specification would either be achieved through text entry (e.g. into a UIL file) or graphically using a GUI-builder in order to achieve the desired modification to the GUI. In addition, changes to the widget-specifying input (e.g. UIL) file would typically require new or altered callback routines. For example, it might be necessary to write a callback routine that executes whenever the user checks the checkbox next to the text label "a_example.opt_P.opt_arg1", to activate the text field next to this text label and the checkbox next to the text label "a_example.opt_P.opt_arg2". Furthermore, if the application source code is not available to the user (as is typical), it would be necessary for the application developer to write the required callback routine.
The structure of IDS 13

In AdaVision, the internal format (i.e. IDS 13) corresponding to user input file 10 has been implemented in the C++ programming language as a hierarchy of five different types of objects (hereinafter sometimes referred to as nodes): command (CMD), sub-expression (SUB), identifier (ID), literal (LIT), and option (OPT). IDS 13 is used to store actual commands and options, and can also be used to create GUI widgets that display and permit modification of these commands and options. The objects forming IDS 13 must remember the attributes and the argument syntax for the commands (and their options) as described in input file 10. In addition, these objects store handles to their corresponding widgets and ID objects store the actual values of identifiers (command and option arguments entered by the user).

IDS 13 contains a command table which is an array of CMD objects, each CMD object corresponding to a respective command definition in input file 10. Each CMD object contains information about the command, including its name (e.g. a.example) and attributes (e.g. LAST, COMMON) and a pointer to a SUB node. In turn, this SUB node contains a pointer to a list of OPT nodes. This list contains one OPT node for each command option and a special type of an OPT node, i.e. an OPT-ARG node, for the command arguments.

Each SUB node is essentially a container for a list of other nodes and, thus, has a list of pointers to other nodes. As indicated above, there is a SUB node pointed to by each CMD node. In addition, there is a SUB node associated with and pointed to by each OPT node (including OPT_ARG nodes). Finally, there is a SUB node corresponding to each occurrence of "[]" in the command definition (which signifies optionality). Each SUB node contains a "loopdef" field, that specifies the number of times the list of nodes associated with the SUB node may be processed. The values for loopdef in SUB nodes corresponding to an occurrence in the command definition of "[]*", "[]+" and "[]" (not followed by either a "*" or a "+"), respectively, are ZERO_OR_MORE, ONE_OR_MORE, and ZERO_OR_ONE, respectively. The value of loopdef in SUB nodes pointed to by CMD or OPT nodes is TOP_ONE, indicating that the SUB node is a container for processing its list of associated nodes exactly once.

Each ID node stores a single identifier, e.g. a command argument or option argument. Each LIT node contains a literal character string required by the UNIX shell command (e.g. some commands require a double quote around an argument).

Each OPT node contains information about a single option, including its attributes and, as mentioned above, a pointer to a SUB node. A special kind of OPT node corresponds to the command arguments (OPT-arg). Each OPT node is in the list of nodes associated with the SUB node pointed to by the CMD node.
Parsing user-editable input file 10

Figure 4:
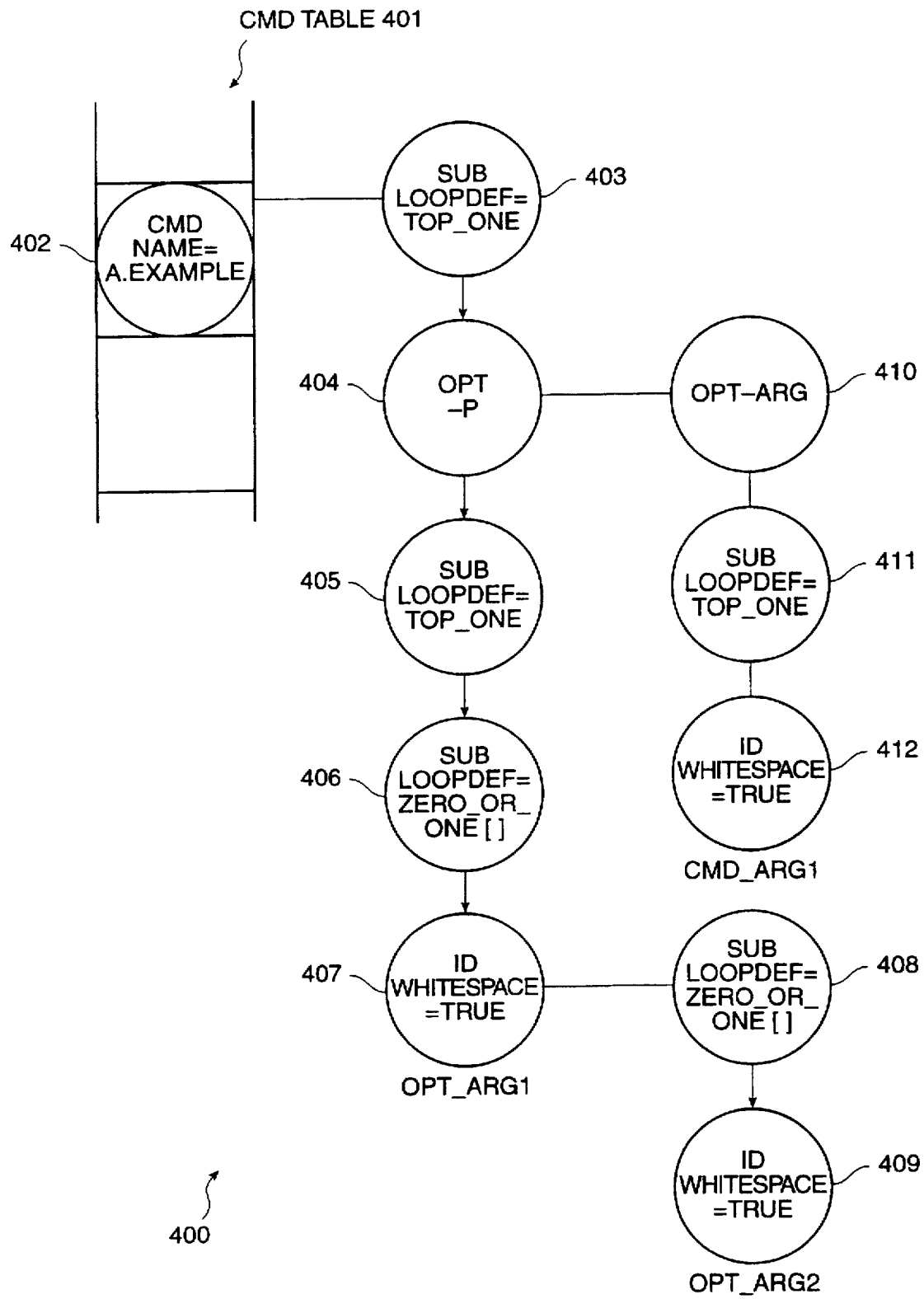
FIG. 4 depicts the structure of the application's internal format (stored in IDS 13) for the command definition corresponding to the GUI of FIG. 3.

As mentioned above, when application 11 starts to execute, parser 12 parses input file 10 (which contains the command definitions) to produce a corresponding internal format, IDS 13. IDS 13 consists of a hierarchy of objects of the types described above and representing the command argument, command attribute, option and option attribute information contained in the command definition(s). (In some embodiments, user input could trigger parser 12 to parse input file at an arbitrary time during execution of application 11.) FIG. 4 presents a hierarchy 400 of nodes that parser 12 would produce as part of IDS 13 upon parsing the expanded definition of the a.example command presented above. Pseudocode for carrying out the function of parser 12 is provided immediately below:

```
        Init_Commands()

Command cmd = NULL;
        Node node = NULL;
1       open external file;
2       while ( not end-of-file ) do
3           get next token;                    // token cannot be a
4                                              // "blank" character
5           if (token is "COMMAND") then
6               if (node is not NULL and cmd is not NULL) then
7                   if (cmd.SUB is NULL) then
8                       cmd.SUB = new SUB node;
9                   endif;
10                  insert node into cmd.SUB's list;
11              endif;
12              node = NULL;
13              get next token;                // the command's name
14              cmd = new Command;
15              cmd.name = token;
16              process_attributes();          // do the ones before { }
17                                             // (advances the token)
18              if (token is '{') then
19                  node = process_arg_syntax();
```

```
-continued
20          if (node is not NULL) then
21              create an OPT-arg node;
22              OPT-arg.SUB = node;
23              node = OPT-arg;
24          endif;
25          endif;
26          process_attributes();    // do the ones after {}
27                                   // (advances the token)
28          add command to command table;
29      else if (token is not NULL) then
30          create an OPT node; OPT.name = token;
31          if (cmd.SUB is NULL) then
32              cmd.SUB = new SUB node;
33          endif;
34          insert OPT into cmd.SUB's list;
35          process_option_attributes();  // do the ones before {}
36                                        // (advances the token)
37          if (token is '{') then
38              OPT.SUB = process_arg_syntax ();
39          endif;
40          process_option_atrributes ();  // do the ones after {}
41                                         // (advances the token)
42      endif;
43   endloop;
44   close external file;
45   if (node is not NULL and cmd is not NULL) then
46      if (cmd.SUB is NULL) then
47          cmd.SUB = new SUB node;
48      endif;
49      insert node into cmd.SUB's list
50   endif;
  end Init_Commands;
  process_attributes ()

read command attribute tokens (if any) and set
     corresponding flags in the CMD object's data until a '{'
     or an end-of-line is read.
  end process_option_attributes;
  process_option_attributes()

read option attribute tokens (if any) and set
     corresponding flags in the OPT object's data until a '{'
     or an end-of-line is read.
  end process_option_attributes;
  Node process_arg_syntax ()

Node    node;
     boolean whitespace = FALSE;
1    create a SUB node;
2    get next token;                    // token can be a "blank"
3                                       // character
4    while (token is not NULL) do
5       if (token is '}') then          // return at end of {...}
6           return SUB node;
7       else if (toekn is '[') then
8           // We must process an optional (or nested) part of
9           // the syntax, delimited by [ ]
10          node = process_arg_syntax();    // recursive call
11                                          // creates a SUB nide
12          node.whitespace = whitespace;
13          whitespace = FALSE;
14          get next token;
15          if (token is '*') then
16              node.loopdef = ZERO_OR_MORE;
17              get next token;
18          else if (token is '+') then
19              node.loopdef = ONE_OR_ONE;
20              get next token;
21          else
22              node.loopdef = ZERO_OR_ONE;
23          endif;
24          insert node into SUB's list
25       else if (token is ']') then    // return at end of [...]
26          return SUB node;
27       else if (token is '<')then
28          // We must process an identifier definition,
29          // delimited by <>
30          create an ID node;
31          ID.whitespace = whitespace;
32          whitespace = FALSE;
```

-continued

```
33              get LABEL:TYPE:VALUE:DEFAULT> fields (if necessary);
34              get next token;
35              insert ID into SUB's list
36       else if (token is a space character-blank, tab, etc.) then
37              // whitespace is significant in the argument syntax.
38              // It indicates that similar whitespace must exist
39              // in that location in the UNIX command string. We
40              // attach it as an "attribute" to the next node that
41              // is created.
42              whitespace = TRUE;
43              while (token is a space character) do
44                  get next token;
45              endloop;
46       else
47              // Any characters other than }[ ]<> or whitespace is
48              // assumed to be a literal in the command. It
49              // indicates that a similiar literal must exist in
50              // that location in the UNIX command string.
51              create a LIT node;
52              LIT.whitespace = whitespace;
53              whitespace = FALSE;
54              get next token;
55              insert LIT into SUB's list
56       endif;
57   endloop;
end process_arg_syntax;
```

Table 1 illustrates steps performed by the above pseudocode when parsing the expanded definition of the a.example command, presented above, to produce the internal format of FIG. 4.

TABLE 1

| Token read | Location | Action Taken |
|---|---|---|
| COMMAND | Init_Commands (IC) Line 3 | |
| a.example | IC, line 13 | |
| | IC, line 14 | Create CMD node 402 |
| | IC, line 15 | CMD.name ← a.example. |
| | IC, line 16 | Call process_attributes to process any attributes on command line after CMD name & before { } |
| { | last token obtained in process_attributes | |
| | IC, line 19 | call process_arg_syntax (PAS) - call #1 |
| | PAS, line 1 | create SUB node 411 |
| blank | PAS, line 2 | |
| | PAS, line 42 | whitespace ← TRUE |
| < | PAS, line 44 | |
| | PAS, line 30 | create ID node 412 |
| | PAS, line 31 | whitespace field of ID node 412 set to TRUE (indicates that a blank to precede corresponding arg in UNIX command string) |
| cmd_arg1 | PAS, line 33 | |
| > | PAS, line 33 | |
| | PAS, line 33 | Set name field of ID node 412 |
| to cmd_arg1 | | |
| } | PAS, line 34 | |
| | PAS, line 35 | insert ID node 412 into node list of SUB node 411 |
| | PAS, line 6 | return SUB node 411 to IC line 19 (return from call #1) |
| | IC, line 21 | create OPT-ARG node 410 |
| | IC, line 22 | set SUB pointer of OPT-ARG node 410 to point to SUB node 411 |
| | IC, line 23 | node ← OPT-arg node 410 |
| | IC, line 26 | call process_attributes to process any attributes on command line after { } |
| NULL | last token obtained in process_attributes | |
| | IC, line 28 | add CMD node 402 to |

TABLE 1-continued

| Token read | Location | Action Taken |
|---|---|---|
| | | command table 401 |
| -P | IC, line 3 | |
| | IC, line 30 | create OPT node 404 for OPTION"-P" and store "-P" in name field of node 404 |
| | IC, line 32 | create SUB node 403 make SUB ptr of CMD node 402 point to SUB node 403 |
| | IC, line 34 | insert OPT node 404 into node list of SUB node 403 |
| | IC, line 35 | call process_option_attributes to process any attributes on option line after option name & before { } |
| { | last token obtained in process_option_ attributes | |
| | IC, line 38 | call process_arg_syntax (PAS) - call #2 |
| | PAS, line 1 | create SUB node 405 |
| [ | PAS, line 2 | |
| | PAS, line 10 | call PAS - call #3 |
| | PAS, line 1 | create SUB node 406 |
| blank | PAS, line 2 | |
| | PAS, line 42 | whitespace ← TRUE |
| < | PAS, line 44 | |
| | PAS, line 30 | create ID node 407 |
| | PAS, line 31 | set whitespace field of ID node 407 to TRUE |
| opt_arg1 | PAS, line 33 | |
| > | PAS, line 33 | |
| | PAS, line 33 | set name field of ID node 407 to opt_arg 1 |
| [ | PAS, line 34 | |
| | PAS, line 35 | insert ID node 407 into node list of SUB node 406 |
| | PAS, line 10 | call PAS-call #4 |
| | PAS, line 1 | create SUB node 408 |
| blank | PAS, line 2 | |
| | PAS, line 42 | whitespace ← TRUE |
| < | PAS, line 44 | |
| | PAS, line 30 | create ID node 409 |
| | PAS, line 31 | set whitespace field of ID node 409 to TRUE |
| opt_arg 2 | PAS, line 33 | |
| > | PAS, line 33 | |
| | PAS, line 33 | set name field of ID node 409 to opt_arg2 |
| ] | PAS, line 34 | |
| | PAS, line 35 | insert ID node 409 into node list of SUB node 408 |
| | PAS, line 26 | return SUB node 408 to PAS line 10 (return from call #4) |
| ] | PAS, line 14 | |
| | PAS, line 22 | set loopdef field of SUB node 408 to ZERO_OR_ONE |
| | PAS, line 24 | insert SUB node 408 into node list of SUB node 406 |
| | PAS, line 26 | return SUB node 406 to PAS, line 10 (return from call #3) |
| } | PAS, line 14 | |
| | PAS, line 22 | set loopdef field of SUB node 406 to ZERO_OR_ONE |
| | PAS, line 24 | insert SUB node 406 into node list of SUB node 405 |
| | PAS, line 6 | return SUB node 405 to IC line 38 (return from call #2) |
| | IC, line 38 | set SUB pointer field of OPT node 404 to point to SUB node 405 |
| NULL | IC, line 40 | call process_option_attributes to process any attributes on option line after { } |
| | IC, line 49 | insert OPT-ARG node 410 into node list of SUB node 403 |

Command and Option Attributes

As indicated by the presence of the routines process__attributes( ) and process__option__attributes( ) in the above pseudocode, each command and option line of a command definition can have one or more attributes. Some of the attributes affect the execution of a command string formed in accordance with the definition. For example, the JOB command attribute indicates that the command string is to be executed by UNIX in the background.

Other attributes affect the GUI that application 11 constructs to reflect the command definition. For example, the MANY option attribute signifies that the option can be repeated more than once in the command string. As a result, operations code 14 creates a scrolling list that allows the user to repeatedly enter values for the option's argument(s). Yet other attributes affect the command strings formed according to the command definition. For example, the LAST option attribute indicates that the option and its arguments are to appear at the end of the command string.

Operations Code 14

Operations code 14 (which performs widget creation and callback processing for application 11) contains the following eight functions for each of the five object types described above. Pseudocode for the functions is presented in Appendix 2, and should be referred to while reading through several examples of callback processing presented below in tabular format:

| Function name | Action |
|---|---|
| Construct__Props() | create widgets required to represent the arguments and options of a command stored in IDS 13. usually called once for each command. |
| Destroy__Props() | destroy widgets previously created (via Construct__Props) to represent a particular command |
| Display__Props() | copy data from a representation for a command stored in IDS 13 to widgets that were previously created for that command (via Construct__Props). called just before the widgets are managed (i.e. displayed on the screen). |
| Apply__Props() | copy data entered by the user into widgets of the GUI representing a particular command (created via Construct__Props) to the representation for the command in IDS 13. called when the Ok or Apply button is pressed. |
| Activate() | cause a widget hierarchy to become active. called when a user turns a checkbox "on". |
| Inactivate() | cause a widget hierarchy to become inactive. called when a user turns a checkbox "off". |
| Parse__Command() | parse a command string stored on disk and copy data from the command string into the representation for the command in IDS 13. called only if commands are available in UNIX command string form. |
| Construct__Command() | translate the representation for a particular command stored in IDS 13 into a command string for use as a UNIX comman ready to execute and/or for storage on (and future retrieval from) disk. |

The desired function action is achieved by invoking the associated function of the CMD object corresponding to the command definition of interest. This function then calls the associated function of the SUB object pointed to by the CMD object. Each function call of a SUB object calls the same function in each of the objects in its list. Each function call of an OPT object calls the same function of the SUB object pointed to by the OPT object.

Thus, operations code 14 is designed to "walk" through the hierarchy of objects of IDS 13 (as will become clearer after presentation of several examples further below). Because operations code 14 has been designed in this way, the set of callback routines of application 11 does not need to be modified or expanded upon changes to input file 10 (performed by the user in order to change the GUI of application 11).

Figure 5:
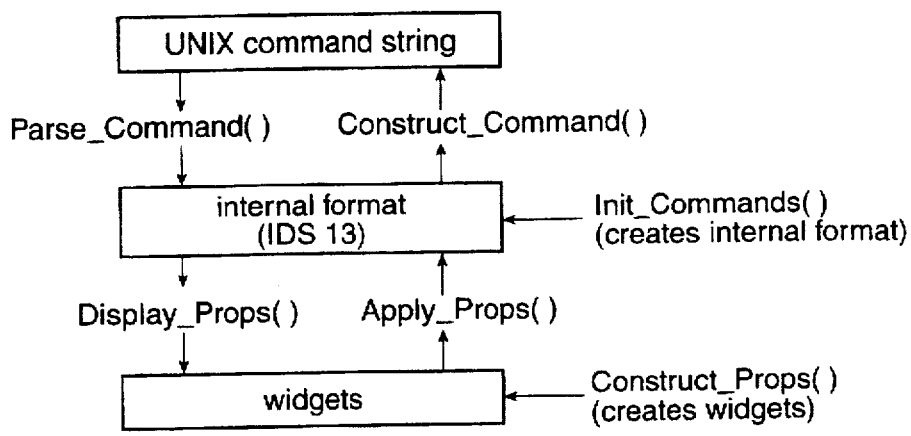
FIG. 5 illustrates the three formats used by the invention to store command information.

In application 11, a command and its options are represented in 3 formats:

1) as a set of widgets (which in this embodiment are maintained by Motif/XWindows) underlying the GUI of application 11;
2) in an internal format, i.e. IDS 13 , described above;
3) and as a command string ready for execution. FIG. 5 illustrates the three formats and the functions of operations code 14 used to translate between the formats. The processing performed in various functions in operations code 14 will be described in some detail below in conjunction with several examples.

Initiation of Application 11 and callback processing

When AdaVision begins to execute, the routine Init__Commands( ) is called to parse input file 10 into IDS 13 (i.e. the corresponding internal format), as described above. Then AdaVision displays its main window. When the user clicks on a particular menu item of the main window, a Command Options window is created and displayed in order to show the user the structure of the arguments and options of a particular command.

Figure 6:
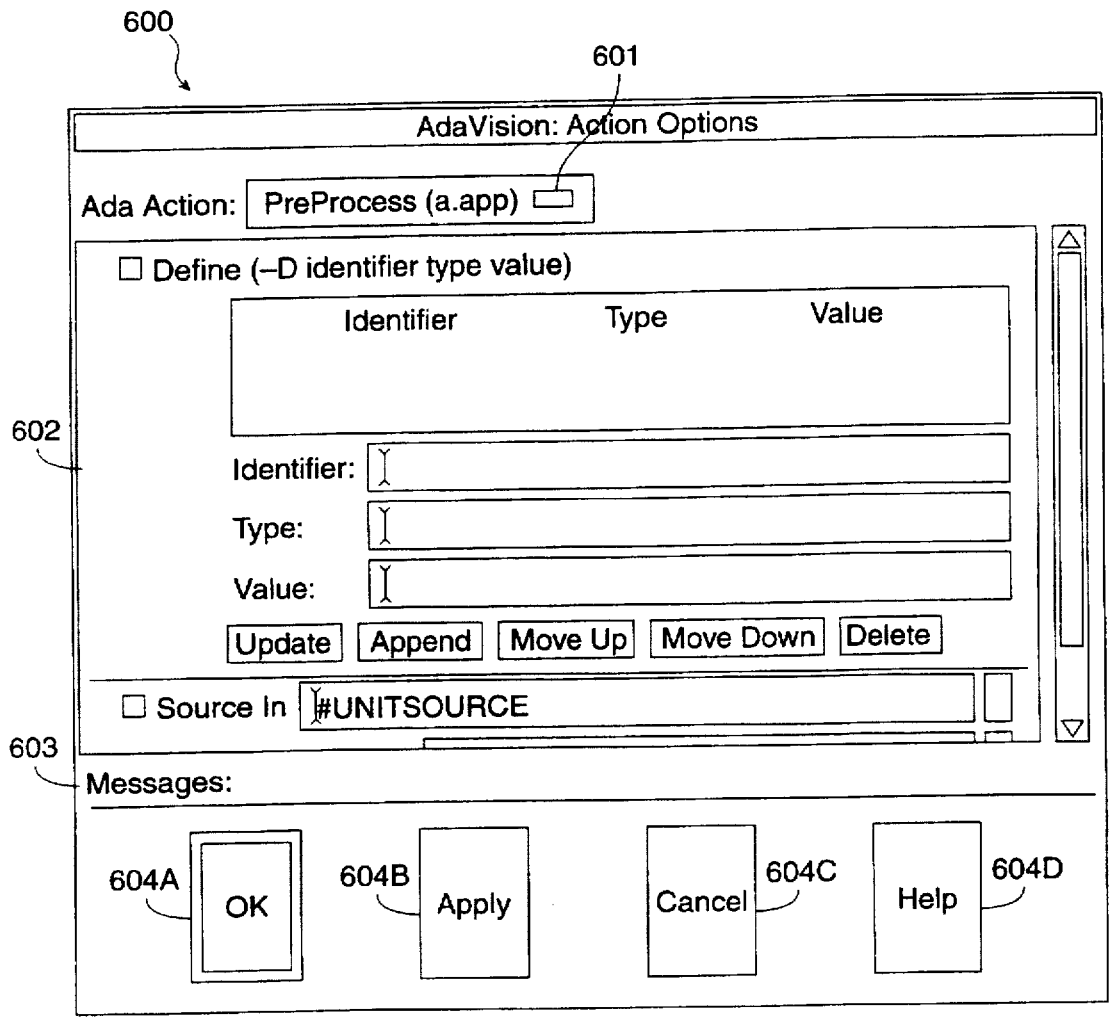
FIG. 6 depicts a "Command Options" window which displays the structure of a command's arguments and options.

FIG. 6 depicts one example of a Command Options window 600 for the command "PreProcess". At the top of window 600 is a button 601, whose associated menu is constructed from the name fields of the CMD objects in the command table of IDS 13. Underneath the menu button is an options frame 602 where the widgets for all the options and arguments for the "PreProcess" command are displayed. Under frame 602 is a message area 603 (for error reporting) and a row of buttons 604A–D (Ok, Apply, Cancel, Help).

The first Commands Options window brought up by AdaVision is created for the first command definition in input file 10 by calling the Construct__Props( ) function (and then the Display__Props function) of the CMD object in IDS 13 corresponding to the first command definition. Display__Props( ) places a command string to be parsed into a command buffer. This command string is either retrieved from disk, or if no such command is stored on disk, constructed from the name of the selected command and the names of units and/or libraries the user has selected from AdaVision's Unit View and/or Library View windows. Display__Props( ) then calls Parse__Command( ) to translate the command string in the buffer into the corresponding IDS (13). An example of the processing performed in Construct__Props and Display__Props is described below in conjunction with the discussion of the callback routine, MenuButton__Callback. This callback routine is executed upon selection of a command from the menulist that is brought up upon clicking on menu button 601.

Figure 7:
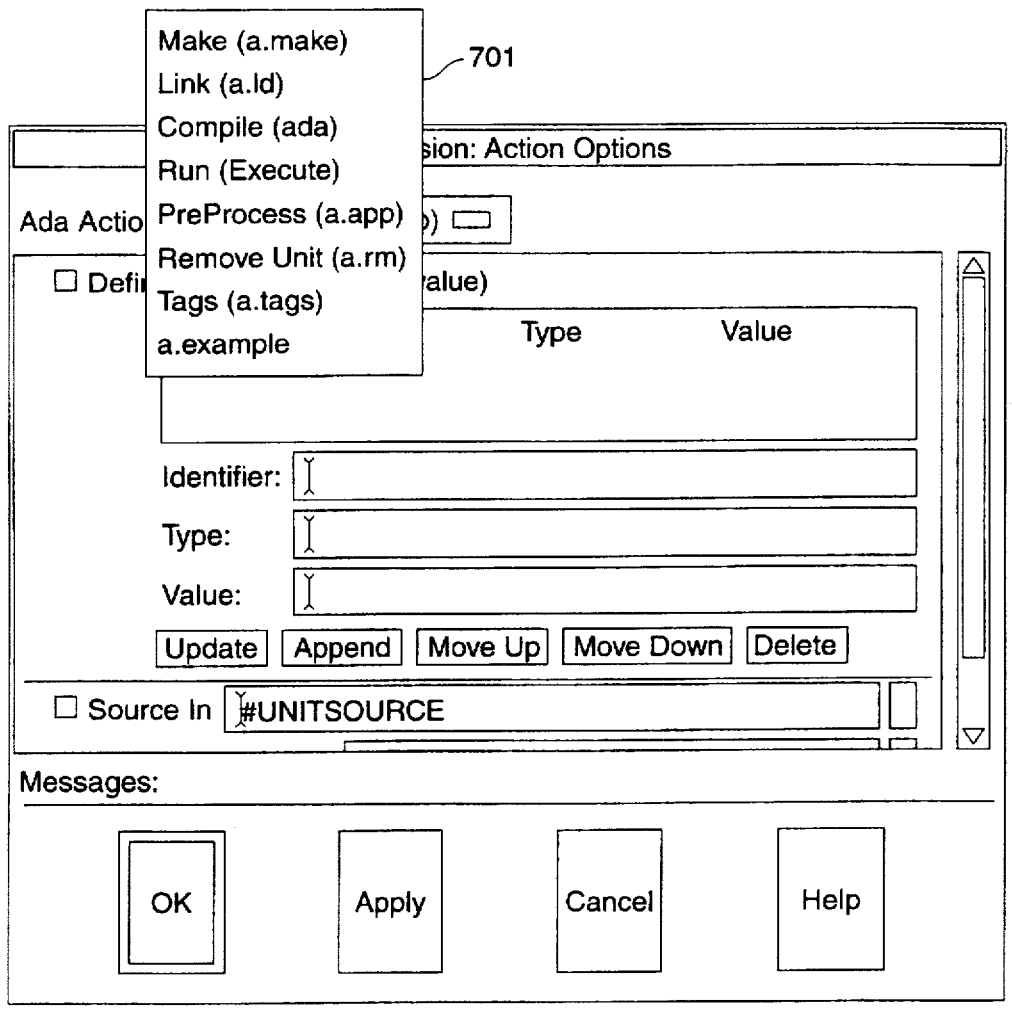
FIG. 7 depicts the window of FIG. 6 covered by a menulist of available commands whose arguments and options can be displayed at the request of the user.

As mentioned above, the user can see the entire list of available commands by clicking on button 601 of the Command Options window. FIG. 7 depicts the window of FIG. 6 covered by a menu 701 displaying such a list of available commands. When another command is chosen from menu 701, a new frame is created and filled with widgets for the chosen command by calling Construct__Props( ), and then Display__Props( ), for the corresponding CMD object. The old frame is set aside, not destroyed, so that redisplaying it will be faster (i.e. no need to call Construct__Props to create the widgets). However, redisplaying an old command will still call Display__Props( ) in case the available UNIX command string has been changed since the first display.

Currently, Adavision does not call Destroy_Props( ) to destroy the widgets of a Command Options window, but there are three possible reasons for calling Destroy_Props( ):

1) application 11 could be designed to re-read input file 10 in order to reflect user changes to file 10 made during execution of application 11. Thus, application 11 would have to destroy and re-create the widgets.
2) if application 11 would allow the user to customize the command options window to leave out certain options that they don't care about it would have to destroy and re-create the widgets every time they were customized.
3) if application 11 creates copies of the widgets for temporary purposes it would have to destroy the copies.

Pseudocode for the Callback routines

As described above, each callback routine of application 11 is called upon the occurrence of a particular interaction of the user with a widget of GUI 16. Examples of such an interaction are clicking on a checkbox, typing into a text field, and selecting a command from the menulist of commands. The callbacks for the various widgets created by Options_Callouts are contained within the Options_Callouts software (which, as described above, isolates the rest of application 11 from the particular widget creation/ management system used). Each of the callback routines sets a "changed" flag in the Command Options window. This is an enhancement that makes it easier to skip a lot of steps when the Ok, Apply, or Cancel button is clicked. For instance, if "changed" is FALSE when the Ok button is clicked, it will not be necessary to call Apply_Props( ) (to copy changes made by the user to the widgets into the corresponding part of IDS 13 ) since a value of FALSE for "changed" indicates that the user didn't make any changes. Pseudocode for the callback routines is given by the following:

```
CheckBox_Callback (Widget checkbox)
    Widget cmdoptions_window;
    cmdoptions_window = Parent (Parent (checkbox));
    cmdoptions_window->changed = TRUE;
    if (checkbox is set) then
        current_command->Activate (checkbox);
    else
        current_command->Inactivate (checkbox);
    endif;
end CheckBox_Callback;
Textfield_Callback (Widget textfield)
    Widget cmdoptions_window;
    cmdoptions_window = Parent(Parent(textfield));
    cmdoptions_window->changed = TRUE;
end Textfield_Callback;
FileTextfield_Callback(Widget filetextfield)
    Widget cmdoptions_window;
    cmdoptions_window =Parent (Parent (Parent (filetextfield)));
    cmdoptions_window->changed = TRUE;
end FileTextfield_Callback;
ExclusiveChoice_Callback (Widget exclusivechoice)
    Widget cmdoptions_window;
    cmdoptions_window =
        Parent(Parent(Parent(exclusivechoice)));
    cmdoptions_window->changed = TRUE;
end ExclusiveChoice_Callback;
ScrollingList_Callback(Widget scrollinglist)
    Widget cmdoptions_window;
    cmdoptions_window = Parent(Parent(scrollinglist));
    cmdoptions_window->changed = TRUE;
end ScrollingList_callback;
MenuButton_Callback (int commandindex)
    //    Don't do a new command unless the old one is clean:
    if (changed) then
        ask the user if she wants to save changes
```

```
        if (yes) then
            current_command->Apply_Props();
        endif;
    endif;
    //    Take down old command options before displaying new
    //    ones.
    if    (options_frame[current_commandindex] is not NULL)
        then
            // Stop displaying the window
            Unmanage (options_frame[current_commandindex]);
    endif;
    current_commandindex = commandindex;
    current_command = command_table[current_commandindex];
    if (options_frame[current_commandindex] is NULL) then
            options_frame[current_commandindex] = new options
                frame;
            current_command->Construct_Props();
    }
    current_command->Display_Props();
    changed = FALSE;
    // Start displaying the window
    Manage(options_frame[current_commandindex]);
end MenuButton_Callback;
OkButton_Callback ()
    if (changed) then
            // Let Apply_Props() do all the work
            current_command->Apply_Props();
            changed = FALSE;
    endif;
    // Take the window down
    Unmanage(options_frame[current_commandindex]);
end OkButton_Callback;
ApplyButton_Callback ()
    if (changed) then
            //    Let Apply_Props() do all the work
            current_command->Apply_Props();
            changed = FALSE;
    endif;
end ApplyButton_Callback;
CancelButton_Callback()
    changed = FALSE;
    //    Take the window down; do not Destroy_Props()!!
    Unmanage (options_frame[current_commandindex]);
end CancelButton_Callback;
HelpButton_Callback ()
    if (current_command->help_tag is not NULL) then
            ShowHelp(current_command->help_tag);
    endif;
end HelpButton_Callback;
The following callback demonstrates the use of
Construct_Command() when the user clicks in the Command
(Actions) menu to execute a command.
CommandMenu_Callback (int commandindex)
    command_table[commandindex]->Construct_Command ()
    Execute_Command(command buffer);
end CommandMenu_Callback;
``` field entry callbacks

Figure 8B:
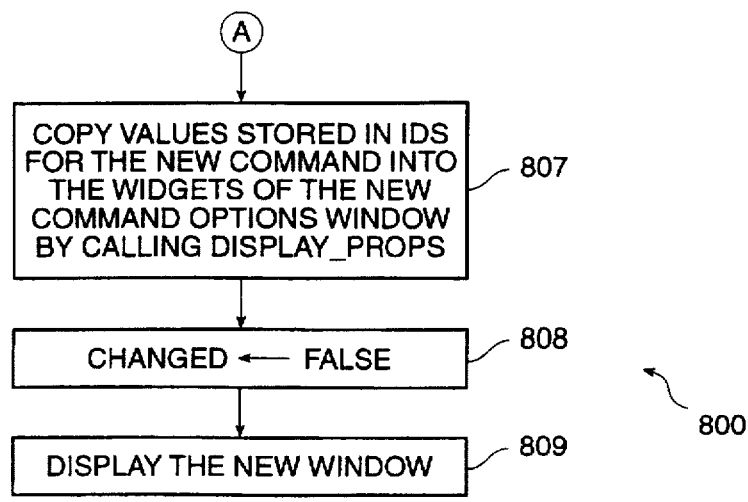
FIGS. 8A–8B depict an overview flowchart for the call-back routine executed when the user selects a command from a menu list of commands.
Figure 8A:
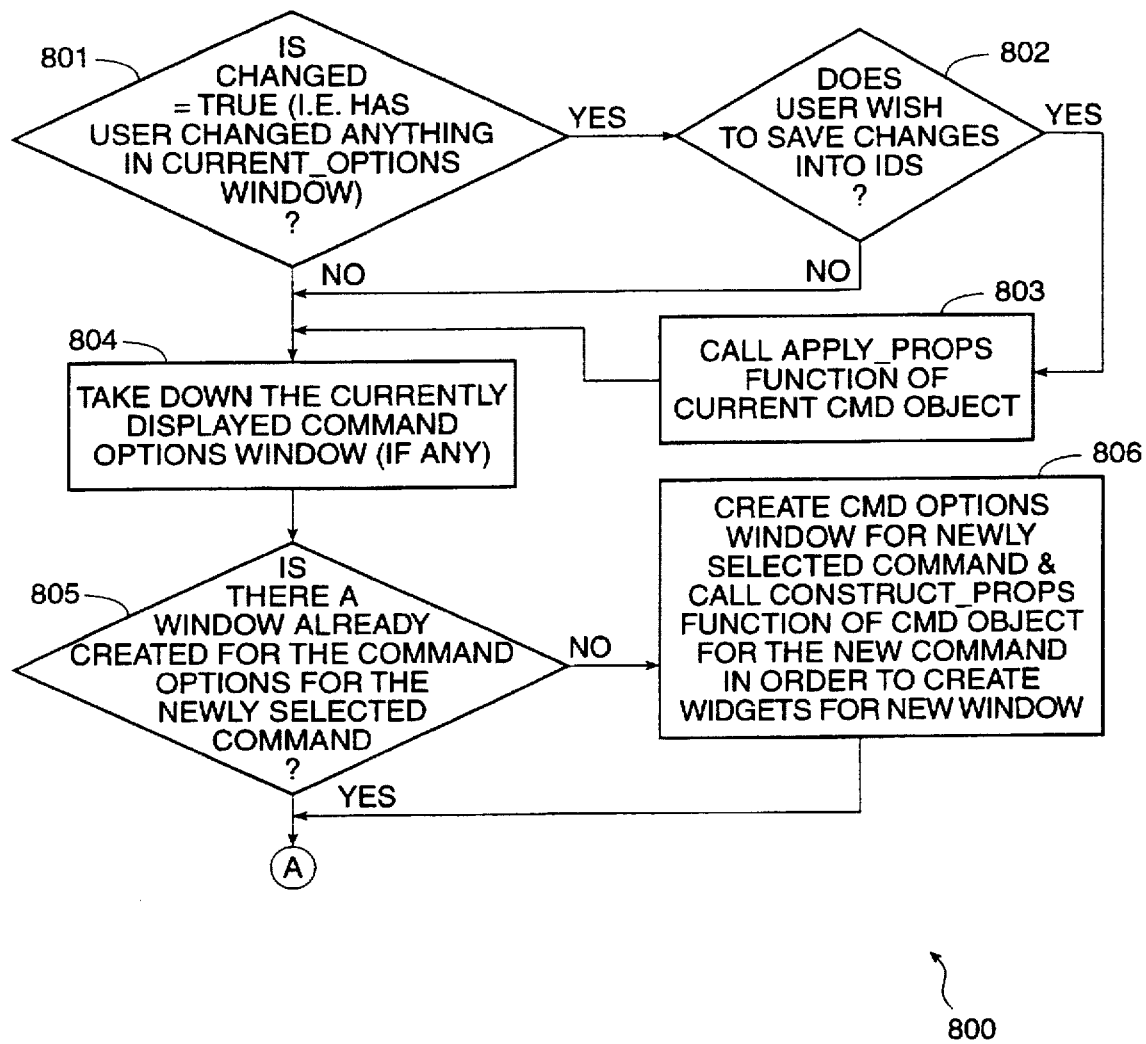

The callbacks for entering into a text field, a file text field, an exclusive choice field, and a scrolling list (i.e. Textfield_Callback, FileTextfield_Callback, ExclusiveChoice_Callback, ScrollingList_Callback, respectively) merely set the "changed" flag in the Command Options window to TRUE for the above indicated reason.

callback for selecting a command from the command list in order to display the command's arguments and options FIGS. 8A–8B depict a flowchart of the callback routine "MenuButton_Callback". This routine is executed when the user clicks on a command in the menulist of commands that can be displayed over the Commands Options window (see menulist 701 of FIG. 7). This callback routine will be described in conjunction with an example in which the user selects the eighth and final entry "a.example" from menulist 701 in FIG. 7. If the "changed" flag of the current Command Options window is TRUE and the user wishes to save the changes made to the window's widgets into IDS 13 , then Apply_Props of the CMD object corresponding to the current Commands Options window is called (steps 801–803). Next, the window is taken down (but not destroyed, in order to facilitate fast redisplay in the future) (step 804).

Assuming no Command Options window was previously created for the selected command (i.e. "a.example"), such a window is created. The widgets required for the new window are created by calling Construct_Props of the CMD object corresponding to the selected command (steps 805–806). Table 2 shows the resulting hierarchy of function calls and the associated steps taken if the structure stored in IDS 13 for the "a.example" command is that illustrated in FIG. 4. The steps creating the widgets of FIG. 3 are bolded.

TABLE 2

| Function call | Actions performed within function call |
| --- | --- |
| CMD401.Construct_Props | SUB403.Construct_Props |
| SUB403.Construct_Props | OPT404.Construct_Props |
| | OPT-ARG 410.Construct_Props |
| OPT404.Construct_Props | create checkbox 301 and text label 311 |
| | OPT404.my_ui_handle ← UI handle of checkbox 301 |
| | create label 311 |
| | SUB405.Construc_Props |
| SUB405.Construct_Props | SUB406.Construct_Props |
| SUB406.Construct_Props | create checkbox 302 |
| | SUB406.my_ui_handle ← UI handle |

TABLE 2-continued

| Function call | Actions performed within function call |
| --- | --- |
| | of checkbox 302 |
| | ID407.Construct_Props |
| | SUB408.Construct_Props |
| ID407.Construct_Props | create label 303 |
| | create text field 304 |
| SUB408.Construct_Props | create a checkbox 305 |
| | SUB408.my_ui_handle ← UI handle of checkbox 305 |
| | ID409.Construct_Props |
| ID409.Construct_Props | create label 306 |
| | create text field 307 |
| OPT-ARG410.Construct_Props | create separator line 308 |
| | SUB411.Construct_Props |
| SUB411.Construct_Props | ID412.Construct_Props |
| ID412.Construct_Props | create label 309 |
| | create text field 310 |

Next, in step 807 Display_Props of the CMD object 402 is called in order to copy command and option argument values stored in IDS 13 for the "a.example" command into the widgets created in step 806. The corresponding hierarchy of calls is given by Table 3. The steps directly affecting the widgets of FIG. 3 have been bolded.

TABLE 3

| Function call | Actions performed within function |
| --- | --- |
| CMD402.Display_Props | retrieve stored command string (i.e. "a.example val1 –P val2 val3 ")from disk and insert into command buffer; CMD402.Parse_Command (See Table 4) SUB403.Display_Props(0) |
| SUB403.Display_Props(0) | OPT404.Display_Props(0) |
| OPT404.Display_Props(0) | make checkbox 301 checked (since OPT404.Active = TRUE); SUB405.Display_Props(0) |
| SUB405.Display_Props(0) | SUB406.Display_Props(0) |
| SUB406.Display_Props(0) | make checkbox 302 checked (since SUB406.loopcount = 1 >0); ID407.Display_Props(0) |
| ID407.Display_Props(0) | value of text widget 304 ← ID407.value[0] = val2; return to SUB406.Display_Props |
| SUB406.Display_Props | ID407.Activate (NULL); (since SUB406.loopcount = 1>0) |
| ID407.Activate (NULL) | activate local widgets of ID407 (i.e. text label 303 & text field 304); return to SUB406.Display_Props |
| SUB406.Display_Props | SUB408.Display_Props(0) |
| SUB408.Display_Props | make checkbox 305 checked (since SUB408.loopcount = 1>0); ID409.Display_Props(0) |
| ID409.Display_Props | value of text widget 307 ← ID409.value[0] = val3; return to SUB408.Display_Props |
| SUB408.Display_Props | ID409.Activate (NULL) |
| ID409.Activate (NULL) | activate local widgets of ID409 (i.e. text label 306 & text field 307); return to SUB408.Display_Props |
| SUB408.Display_Props | return to SUB406.Display_Props |
| SUB406.Display_Props | SUB408.Activate (NULL) |
| SUB408.Activate (NULL) | activate local widgets of SUB408 (i.e. checkbox 305); ID409.Activate (NULL) - see above return to SUB406.Display_Props |
| SUB406.Display_Props | return to SUB405.Display_Props |
| SUB405.Display_Props | SUB406.Activate (NULL) |
| SUB406.Activate (NULL) | activate local widgets of SUB406 (i.e. checkbox 302); ID407.Activate; - see above Sub 408.Activate; - see above return to SUB405.Display_Props |
| SUB405.Display_Props | return to OPT404.Display_Props |
| OPT404.Display_Props | SUB405.Activate; . . . return to OPT404.Display_Props |
| OPT404.Display_Props | return to SUB403.Display_Props |
| SUB403.Display_Props | OPT404.Activate (NULL) |
| OPT404.Activate (NULL) | activate local widget of OPT404 (i.e. checkbox 301 & text label 311 |

TABLE 3-continued

| Function call | Actions performed within function |
|---|---|
| | . . .; return to SUB403.Display_Props |
| SUB403.Display_Props | OPT-ARG410.Display_Props |
| OPT-ARG410.Display_Props | SUB411.Display_Props(0) |
| SUB411.Display_Props(0) | ID412.Display_Props(0) |
| ID412.Display_Props | value of text widget 310 ← ID412.value[0] = val1; return to SUB411.Display_Props |
| SUB411.Display_Props | ID412.Activate (NULL) |
| ID412.Activate (NULL) | activate local widgets of ID412 (i.e. text label 309 & text field 310); return to SUB411.Display_Props |
| SUB411.Display_Props | return to OPT-ARG.410.Display_Props |
| OPT-ARG410.Display_Prop | . . .; return to SUB403.Display_Props |
| SUB403.Display_Props | . . .; return to CMD402.Display_Props |
| CMD402.Display_Props | |

The first call made by Display_Props of CMD object 402 is a call to Parse_Command of the same object. This call to Parse_Command parses a buffer containing the "a.example" command to provide corresponding data to be written into IDS 13. The series of calls resulting from this call is shown in Table 4, in which the steps of writing data into IDS 13 are bolded.

TABLE 4

| Function | Actions performed within function |
|---|---|
| CMD402.Parse_Command | remove CMD402.name, i.e. "a.example" from command buffer; SUB403.Parse_Command |
| SUB403.Parse_Command | result ← FALSE; done ← FALSE; SUB403.loopcount ← 0; parse_failed ← OPT404.Parse_Command |
| OPT404.Parse_Command | reset pointer to start of command buffer; search command buffer for OPT404.name (i.e. "–P") (search is successful); remove "–P" from command buffer; OPT404.Active ← TRUE; temp ← SUB405.Parse_Command |
| SUB405.Parse_Command | result ← FALSE; done← FALSE; SUB405.loopcount ← 0; parse_failed ← SUB406.Parse_Command |
| SUB406.Parse_Command | result ← FALSE; done ← FALSE; SUB406.loopcount ← 0, parse_failed ← ID407.Parse_Command |
| ID407.Parse_Command | remove a space character and val2 from command buffer; ID407.Value[0] ← val2; return FALSE to SUB406.Parse_Command |
| SUB406.Parse_Command | parse_failed FALSE; parse_failed ← SUB408.Parse_Command |
| SUB408.Parse_Command | result ← FALSE; done ← FALSE; SUB408.loopcount ← 0; parse_failed ← ID409.Parse_Command |
| ID409.Parse_Command | remove a space character and val3 from command buffer; ID409.value[0] ← val3; return FALSE to SUB408.Parse_Command |
| SUB408.Parse_Command | SUB408 done ← TRUE.loopcount ← SUB408.loopcount + 1 = 1; (since SUB408.loopdef is ZERO_OR_ONE); return result (=FALSE) to SUB406.Parse_Command |
| SUB406.Parse_Command | parse_failed ← FALSE; SUB406.loopcount ← SUB406.loopcount + 1 = 1; done ← TRUE (since SUB406.loopdef is ZERO_OR_ONE); return result (=FALSE) to SUB405.Parse_Command |
| SUB405.Parse_Command | parse_failed FALSE; SUB405.loopcount ← SUB405.loopcount + 1 = 1; done ← TRUE (since SUB405.loopdef is TOP_ONE); return result (=FALSE) to OPT404.Parse_Command |
| OPT404.Parse_Command | return FALSE to SUB403.Parse_Command |
| SUB403.Parse_Command | parse_failed ← FALSE parse_failed ← OPT_ARG410.Parse_Command |
| OPT-ARG410.Parse_Command | reset pointer to start of command buffer; temp ← |

TABLE 4-continued

| Function | Actions performed within function |
| --- | --- |
| SUB411.Parse_Command | SUB411.Parse_Command<br>result ← FALSE; done ← FALSE;<br>SUB411.loopcount ← 0; parse_failed ← ID412.Parse_Command |
| ID412.Parse_Command | remove a space character and val1 from command buffer; ID412.value[0] ← val1; return FALSE to SUB411.Parse_Command |
| SUB411.Parse_Command | SUB411.loopcount ← SUB411.loopcount + 1 = 1;<br>done ← TRUE; (since SUB411.loopdef is TOP_ONE); return result (=FALSE) to OPT_ARG410.Parse_Command |
| OPT-ARG410.Parse_Command | OPT-ARG410.active ← TRUE; return FALSE to SUB403.Parse_Command |
| SUB403.Parse_Command | parse_failed ← FALSE<br>SUB403.loopcount ← SUB403.loopcount + 1 = 1;<br>done ← TRUE; (since SUB403.loopdef = TOP_ONE); return FALSE to CMD402.Parse_Command |
| CMD402.Parse_Command | return FALSE |

The contents of Tables 3 and 4 assume that the command instance "a.example val1 –P val2 val3" is parsed by Parse_Command. The processing shown in Table 4 causes val1, val2, and val3 to be copied into ID nodes 412, 407, and 409 (FIG. 4), respectively, of IDS 13.

Finally, the "changed" flag for the new Commands Options window is set to "FALSE" and the window is displayed (steps 808–809). The processing shown in Table 3 causes val1, val2, and val3 to be copied from ID nodes 412, 407, and 409, respectively, to text widgets 310, 304, and 307 (FIG. 3), respectively.

callbacks for copying data entered into widgets by the user into IDS 13

The user saves data entered into screen widgets into IDS 13 by clicking on one of the OK and Apply buttons on the Command Options windows (see buttons 604A–B of FIG. 6). The data saved into IDS 13 can be used to construct a UNIX command string via the Construct_Command routine as discussed further below. The corresponding callback routines for clicking on the Ok and Apply buttons are OKButton_Callback and Apply_Callback, respectively. The only difference between the two routines is that only the OKButton_Callback routine takes down the current Commands Options window.

If the changed flag of the current window is TRUE then each of the 2 callback routines calls Apply_Props of the CMD object corresponding to the current window and then sets the changed flag to FALSE. Table 5 indicates the resulting hierarchy of calls when the user clicks on the OK or Apply button in the Command Options window of FIG.3, after having checked checkboxes 301 and 302 and having entered "val1" and "val2" into text widgets 304 and 310, respectively. In particular, the steps in which the values entered into text widgets 304 and 310 are copied to ID nodes 407 and 412, respectively, of IDS 13 are bolded.

TABLE 5

| Function | Actions performed within function |
| --- | --- |
| CMD402.Apply_Props | temp ← SUB403.Apply_Props(0) |
| SUB403.Apply_Props(0) | result ← FALSE; apply_failed ← OPT404.Apply_Props(0) |
| OPT404.Apply_Props(0) | OPT404.active ← options_callouts.Get_checkbox() = TRUE; status ← SUB405.Apply_Props(0) |
| SUB405.Apply_Props(0) | result ← FALSE; apply_failed ← SUB406.Apply_Props(0) |
| SUB406.Apply_Props(0) | result ← FALSE; apply_failed ← ID407.Apply_Props(0) |
| ID407.Apply_Props(0) | value[0] field of ID node 407 ← value entered by user into text field widget 304 (i.e. val1)<br>(a field specifying widget 304 was stored in ID node 407 when widget 304 was created in ID407.Construc_Props); return FALSE to SUB406.Apply_Props |
| SUB406.Apply_Props(0) | apply_failed ← FALSE;<br>apply_failed ← SUB408.Apply_Props(0) |
| SUB408.Apply_Props(0) | result ← FALSE; return result to SUB406.Apply_Props (i.e. Options_Callouts.Get_Checkbox() returns FALSE because user did not check checkbox 305) |
| SUB406.Apply_Props(0) | apply_failed ← FALSE;<br>done ← TRUE (because SUB406.loopdef is ZERO_OR_ONE);<br>return result (=FALSE) to SUB405.Apply_Props |
| SUB405.Apply_Props(0) | apply_failed ← FALSE;<br>done ← TRUE (because SUB405.loopdef is TOP_ONE); return result (=FALSE) to OPT404.Apply_Props |
| OPT404.Apply_Props(0) | status ← FALSE; return status to SUB403.Apply_Props |

TABLE 5-continued

| Function | Actions performed within function |
|---|---|
| SUB403.Apply_Props(0) | apply_failed ← FALSE;<br>apply_failed ← OPT-ARG410.Apply_Props(0) |
| OPT-ARG410.Apply_Props(0) | status ← SUB411.Apply_Props(0) |
| SUB411.Apply_Props(0) | result ← FALSE;<br>apply_failed ← ID412.Apply_Props(0) |
| ID412.Apply_Props(0) | value[0] field of ID node 412 ← value entered by user into text field widget 310 (i.e. val2)<br>return FALSE to SUB411.Apply_Props |
| SUB411.Apply_Props(0) | apply-failed ← FALSE;<br>done ← TRUE (because SUB411.loopdef is TOP_ONE);<br>return result (=FALSE) to OPT-ARG410.Apply_Props |
| OPT-ARG410.Apply_Props(0) | status ← FALSE; return status to SUB403.Apply_Props |
| SUB403.Apply_Props | apply_failed ← FALSE;<br>done ← TRUE (i.e. SUB403.loopdef is TOP_ONE);<br>return result (=FALSE) to CMD402.Apply_Props |
| CMD402.Apply_Props | |

Callback for clicking in the Command (Actions) menu to execute a command

The callback routine, CommandMenu_Callback, is executed upon clicking in the Command (Actions) menu on a command that the user wishes to execute. CommandMenu_Callback calls Construct_Commands of the CMD object in IDS 13 representing the selected command, in order to construct a UNIX command string using data stored for the selected command in IDS 13. The resulting hierarchy of calls is illustrated in Table 6, assuming that the selected command is "a.example" and the corresponding data for the command in IDS 13 is that associated with Table 5 (i.e. val1 and val2 entered into text widgets 304 and 310, respectively, saved into ID nodes 407 and 412 of IDS 13, respectively). The result of the processing shown in Table 6 is the creation of the UNIX command string "a.example val2 –P val1", which is placed into a command buffer. Finally, CommandMenu_Callback executes the command stored in the command buffer.

TABLE 6

| Function | Actions performed within the function |
|---|---|
| CMD402.Construct_Command | clear command buffers;<br>SUB403.Construct_Command |
| SUB403.Construct_Command | OPT404.Construct_Command |
| OPT404.Construct_Command | choose before_args buffer;<br>(before_args is the default)<br>append option string "–P" to before_args buffer (–P stored in OPT404.name during creation of IDS 13);<br>SUB405.Construct_Command (before_args) |
| SUB405.Construct_Command (before_args) | SUB406.Construct_Command (before_args) |
| SUB406.Construct_Command (before_args) | ID407.Construct_Command (before_args) |
| ID407.Construct_Command (before_args) | append a space and ID407.value[0] (i.e. val1) to before_args. buffer;<br>return to SUB406.Construct_Command |
| SUB406.Construct_Command (before_args) | SUB408.Construct_Command (before_args). |
| SUB408.Construct_Command (before_args) | return to SUB406.Construct_Command (because SUB408.loopcount = 0) |
| SUB406.Construct_Command | return to SUB405.Construct_Command |
| SUB405.Construct_Command | return to OPT404.Construct_Command |
| OPT404.Construct_Command | return to SUB403.Construct_Command |
| SUB403.Construct_Command | OPT-ARG410.Construct_Command |
| OPT-ARG410.Construct_Command | choose the_args buffer;<br>SUB411.Construct_Command (the_args) |
| SUB411.Construct_Command (the_args) | ID412.Construct_Command (the_args) |
| ID412.Construct_Command (the_args) | append a space character and ID412.value[0] (i.e. val2) to the_args buffer;<br>return to SUB411.Construct_Command |
| SUB411.Construct_Command | return to OPT_ARG410.Construct_Command |
| OPT-ARG410.Construct_Command | return to SUB403.Construct_Command |
| SUB403.Construct_Command | return to CMD402.Construct_Command |
| CMD402.Construct_Command | merge CMD402.name (i.e. "a.example") with before_args buffer (i.e. "–P val1") and the_args buffer (i.e. "val 2") and to obtain final UNIX |

TABLE 6-continued

| Function | Actions performed within the function |
|---|---|
| | command string "a.example −P val1 val2" (in this example internal_args, after_args & last_arg buffers are empty) |

Callback for checking a checkbox

The callback routine, CheckBox_Callback is executed whenever any checkbox is checked. XWindows passed to the callback routine a parameter "Checkbox", which is basically a unique identifier (also called a UI handle) for the particular checkbox that was checked. CheckBox_Callback first sets the changed flag for the current Command Options window to TRUE and then calls the Activate function of the CMD object in IDS 13 corresponding to the current window. Table 7 shows the hierarchy of function calls that would result upon checking checkbox 302 in the Command options window of FIG. 3. The steps where text label 303, text field 304 and nested checkbox 305 are activated are shown in bold.

perhaps rarely used, options and command/option optional arguments). A given user, depending on his or her experience level and needs, might only require the program's GUI to display a subset of the full command set structure (e.g. the user never specifies 19 of 20 possible options of a particular command). Employing the techniques of the invention, the program's GUI could be tailored to the user's requirements by editing the input file of command definitions to reflect a simpler command set (e.g. a command with only 1 instead of 20 options). In this way, the program's efficiency would increase because the widget processing burden associated with command options of no interest to the user would be eliminated. In addition, the GUI would not be cluttered with various widgets distracting the user's attention away from the widgets of interest to him or her.

TABLE 7

| Function | Actions performed |
|---|---|
| CMD402.Activate (checkbox 302) | SUB403.Activate (checkbox 302) |
| SUB403.Activate (checkbox 302) | UI ← checkbox 302; |
| | OPT 404.Activate (checkbox 302) |
| OPT404.Activate (checkbox 302) | UI ← checkbox 302; |
| | SUB405.Activate (checkbox 302) |
| SUB405.Activate (checkbox 302) | UI ← checkbox 302; |
| | SUB406.Activate (checkbox 302) |
| SUB406.Activate (checkbox 302) | UI ← checkbox 302; |
| | UI ← NULL (because |
| | SUB406.my_ui_handle = checkbox 302, as set in |
| | SUB406.Construct_Props); ID407. Activate |
| | (NULL) |
| ID407.Activate (NULL) | activate local widgets of ID407 (i.e. text label 303 and text field 304); return to SUB406.Activate |
| SUB406. Activate | SUB408.Activate (NULL) |
| SUB408.Activate (NULL) | UI ← NULL; |
| | activate local widget of SUB405 (i.e. checkbox 305); return to SUB406.Activate (i.e. |
| | SUB408.loopdef is ZERO_OR_ONE and checkbox |
| | 305 was not checked) |
| SUB406.Activate | return to SUB405.Activate |
| SUB405.Activate | return to OPT404.Activate (because UI in |
| | SUB405.Activate = checkbox 302 = |
| | SUB406.Activate → my_ui_handle) |
| OPT404.Activate | return to SUB403.Activate |
| SUB403.Activate | OPT-ARG410.Activate (checkbox 302) |
| OPT-ARG410.Activate (checkbox 302) | UI ← checkbox 302 |
| | SUB411.Activate (checkbox 302) |
| SUB411.Activate (checkbox 302) | UI ← checkbox 302; |
| | ID412.Activate (checkbox 302) |
| ID412.Activate (checkbox 302) | return to SUB411.Activate (since checkbox 302 ≠ NULL) |
| SUB411.Activate | return to OPT-ARG410.Activate |
| OPT-ARG401.Activate | return to SUB403.Activate |
| SUB403.Activate | return to CMD402.Activate |

Conclusion

In the specific embodiment disclosed herein, the entities of interest (instances of which the user can create and modify via the application GUI) are UNIX shell commands. However, the invention is equally applicable to displaying the structure of other entities (not necessarily commands), particularly entities whose structure is likely to change over time and/or vary between end users of the application.

For example, a particular software program might support a command set with an elaborate structure (e.g. many, Therefore, the above description should not be taken as limiting the scope of the invention which is defined by the appended claims.

Appendix 1

Appendix 1 describes a syntax for specifying command definitions, in one embodiment of the invention.

Appendix 2

Appendix 2 provides pseudocode for operations code 14, in one embodiment of the invention.

1

Appendix 1

Format of user-editable input file 10

Comment lines start with #. Blank lines are okay.
Continuation lines end with \. Special characters can be escaped with \.

The keyword COMMAND at beginning of line starts a new command description.
The COMMAND line looks like:

COMMAND name [attributes] [{[argument syntax]}] [attributes]

name:       the UNIX operating system (i.e. shell) command (e.g. a.db)
    attributes:    characteristics that apply. There is a very special attribute, UNRECOGN_OK, which may be used to indicate that the command accepts options that it does not understand, and passes them on to some other command. This would typically be represented by the user interface as a catch-all text field. This is a partial list:
    special attr:  RECOGN_ONLY | UNRECOGN_OK
    target attrs:  ALL | SELF_TARGET | CROSS_TARGET
    I/O attrs:    STDERR | STDIN | STDOUT    (not exclusive)
    job attrs:    NO_JOB | JOB
    pass-on attrs: RECOGN_ONLY | UNRECOGN_OK
    usage attrs:  RARE | COMMON
    argument syntax: see below The same command name may appear in the template more than once, but the target attributes for each must be mutually exclusive. The order in which the commands and options appear

2 may be used as the order of layout on a menu or properties
window. The usage attribute (COMMON or RARE) may be used to
split the commands and options into two parts: a "short"
display vs. extended display.

An option line is any other line of the form:

name [ ¦ alt name] [attributes] [{[argument syntax]}]
      [attributes]

|  |  |
|---|---|
| name: | the shell command option (e.g. -v). Alternate names are separated by vertical bars (e.g. -All ¦ -a). |
| resource: | fragment of resource name containing label. The name is constructed by appending the fragment to the existing name. The convention is "opt_"name-of-option (e.g. opt_x). |
| attributes: | characteristics that apply. This is a partial list: |
| target attrs: | ALL ¦ SELF_TARGET ¦ CROSS_TARGET |
| I/O attrs: | STDERR ¦ STDIN ¦ STDOUT        (not exclusive) |
| position attrs: | ANYWHERE ¦ LAST ¦ BEFORE_ARGS ¦ AFTER_ARGS |
| usage attrs: | RARE ¦ COMMON |
| dup attrs: | ONCE ¦ MANY |
| argument syntax: | see below |

Each attribute has a default value (the first value named), so
if no value is given for a command or option, the default is
assumed.

A label for the GUI can be obtained through X resources, where
the resource name is constructed from the command and option
name as follows:
    - The resource name for a command is the name of the
command (with "." converted to "_") concatenated to the

3 existing resource name. For a command "a.example", the resource name is "AdaVision.a_example".

- The resource name for an option is "opt_" followed by the name of the option concatenated to the resource name of the command. For option "-X", the resource name is "AdaVision.a_example.opt_X".

- The resource name for a sub-option is the name of the sub-option concatenated to the resource name of the options. For sub-option "File", the resource name is "AdaVision.a_example.opt_X.File"

The argument syntax is as follows:

1) [] means optional (zero or one occurrence)
2) []* means zero or more occurrences
3) []+ means one or more occurrences
4) White space is significant within {}; it means whitespace is needed in the command, option, or value. White space immediately following a { or [ acts as a separator between the option and its arguments or between arguments of the option.
5) <> delimits an identifier. Identifiers are placeholders for user input.

ident_syntax::=<resource[:type[:value_list[:default_value]]]>
    value_list    ::=
    value[|alt_value][,value[|alt_value]]*
        | value-value a) resource: fragment of a resource name containing label
    b) Types are one of the following special keywords:
       STRING      - any string (whitespace, too - use with care)
       TOKEN       - any non-whitespace sequence

4

```
PID           - special token, process ID
INTEGER       - special token, unsigned
decimal number
FILE          - special token, any file name
SOURCE_FILE   - special token, Ada source file
name
LIBRARY       - special token, Ada library
name
DIRECTORY     - special token, any directory
UNIT          - special token, Ada unit name
```
If the type is omitted, it defaults to TOKEN.
It may not be necessary to make such fine
distinctions in all cases (all arguments are
ultimately just tokens). AdaVision can make
use of some of these types to display fancier
widgets.

c) Value lists come in 2 flavors:

value[¦alt_value][,value[¦alt_value]]* - These
represent choices that can be used by an
exclusive-choice widget. Choices are any
sequence of characters except comma or vertical
bar. If the type is INTEGER, each choice
string is assigned a consecutive integer value
starting from zero.

Needed by:
a) a.das -d value-value - This represents a range of choices
which can be used by a slider or similar widget.
Choices must be of type INTEGER.

If the value list is omitted, it is assumed that any
value is permitted, and it is the responsibility of
the user to "fill in the blank".

5 d) A default value may be specified for a value
list. If it is not, the default value is the
first value on the list.

Examples:
<Library:LIBRARY>
<Tabs:TOKEN:Inactive,Active>
<Level:INTEGER:0-9:4>

<Level:INTEGER:None,1,2,3,Default,5,6,7,8,Full:Default>

6) All other characters are significant and are to
be taken literally. For example, if a
double-quote (") appears in the syntax, then it
must appear in the option or command.

```

# Here is an example of a command and option description:

COMMAND a.example SELF_TARGET JOB { <Library:LIBRARY>[
<Unit:UNIT>]*}
    -v STDOUT COMMON
    -E COMMON {[ <Error_Directory:DIRECTORY>]}
    -i STDIN
    -D MANY { <IDENTIFIER> <TYPE> <VALUE>}
    -f LAST {[ <Source_Files:SOURCE_FILE>]+}
    -O COMMON {[<Level:INTEGER:0-9:4>]}
    -o COMMON { <file_name:FILE::a.out>}
    -C { "<Ada Command>"}
    OTHER_OPTIONS AFTER_ARGS COMMON
```

------------------------------------------------------------

6

Notes:

1) Context-sensitive help for all these commands and options can be implemented via additional attributes.

2) []* vs. "MANY" The syntax fragment [ ... ]* can be implemented as a multi-column scrolling list (MCSL), where each column corresponds to an identifier, and the number of rows match the number of actual times that the option is repeated (loopindex).

If an option has the MANY attribute, then there may be zero or more instances of it, and this, too, can be implemented as a MCSL.

So as far as making widgets goes, []* is equivalent to "MANY". But the implementation must be different because MANY requires that we repeat the option for each argument (e.g. -A lib1 -A lib2)

3) [ <tok:TOKEN>]* vs. <str:STRING> Both forms can handle blanks, but the TOKEN form would probably end up as a scrolling list widget, while the STRING form is a text field.

If the characters are to be enclosed in quotes, the TOKEN form makes it harder to represent that. STRING types terminate at the character following the STRING ident (must be " or new-line; ] and } don't count) When parsing a command, '"' terminates a STRING enclosed in quotes, and a new-line or a token beginning with '-' terminates a STRING not enclosed in quotes.

---

7

Code will be written to build up an internal data
structure that mirrors the file's descriptions. It will
have several node types:

```
option    (OPT)        "-X"
literal   (LIT)        literals like '"'
subexpr node (SUB)     [...]      zero or one   times
                       [...]*     zero or more  times
                       [...]+     one  or more  times
ID node                <...>      any identifier
```

Each node of the data structure will contain attribute fields,
actual values (or value lists) if necessary, widget pointers
to properties widgets if necessary, active/inactive flags, and
so on. Whitespace will be indicated by a flag in the
following node rather than as a literal node of its own. This
simplifies lookahead during parsing of a command.

An example internal data structure corresponding to one
option: -X [<arg1>[<arg2>]]* <arg3> " <arg4> ":

```
___ -X ___ []* ___ <arg3> ___ " ___ <arg4> ___ "
            |
            |__ <arg1> ___ []
                           |
                           |__ <arg2>
```

Appendix 2

Description of Operations Code

The Operations code was implemented in C++ as derived classes from a base class with virtual functions. This allows nodes of the various derived classes to coexist on a SUB node's list, and for the SUB node's code to dispatch to the proper class function. The Command class is not derived from the base class, but has similar functions. The Command class function is always called first from elsewhere in the application, and it in turn calls the Operations Code for the other node types.

Note that OPT, SUB, and ID nodes may have widgets associated with them after Construct_Props() is called. These "local" widgets can be destroyed, activated, inactivated, and you can get or set their data via the appropriate Options_Callouts.

---------
CMD class
---------

The CMD node type contains a pointer to a SUB node.

```
CMD::Construct_Props()
    //    Create widgets corresponding to the internal format
    //    Everything is actually done in the SUB node
    if  (SUB is not NULL) then
        SUB->Construct_Props();
    endif;
end Construct_Props;

CMD::Destroy_Props()
    //    Destroy widgets originally created by
    //    Construct_Props()
    //    Everything is actually done in the SUB node
    if  (SUB is not NULL) then
        SUB->Destroy_Props();
    endif;
end Destroy_Props;

CMD::Display_Props()
    put command string into global command buffer;
    //    If a command has not been stored on disk, then
    //    a simple command of the form "cmdname argument-list"
    //    will be formed, where argument-list is built from
    //    the selected items, if any, in AdaVision's main
    //    window.
    Parse_Command();
```

2

```
    if (SUB is not NULL) then
        SUB->Display_Props(0);
    endif;
end Display_Props;

CMD::Apply_Props()
    boolean temp;

if (SUB is not NULL) then
        temp = SUB->Apply_Props(0);
    endif;
end Apply_Props;

CMD::Activate(Widget ui_handle)
    if (SUB is not NULL) then
        SUB->Activate(ui_handle);
    endif;
end Activate;

CMD::Inactivate(Widget ui_handle)
    if (SUB is not NULL) then
        SUB->Inactivate(ui_handle)
    endif;
end Inactivate;

boolean
CMD::Parse_Command()
    remove command name from command buffer;
    if (SUB is not NULL) then
        SUB->Parse_Command(0);
    endif;
    return FALSE;
end Parse_Command;

CMD::Construct_Command()
    // There are 5 command buffers defined for building
    //     UNIX commands:
    //       internal_args  - options that do not appear in the
    //       final command
    //       before_args    - options that must appear before any
    //       argument
    //       the_args       - the command arguments
    //       after_args     - options that must appear after any
    //       argument
    //       last_arg       - an option that must be last on the
    //       command line
    // Each option specifies its position by means of an
        attribute.  The default is "before_args".
    clear command buffers
    if (SUB is not NULL) then
        SUB->Construct_Command(0, buffer)
    endif;
    merge name and all 5 command buffers to form complete UNIX
    command string to be stored (if complete command string to
    be executed, do not merge with internal_args buffer)
end Construct_Command;
```

3

---
OPT class
---

The OPT node type contains a pointer to a SUB node. It also
contains a flag, active, describing whether the option is
currently in use.

```
OPT::Construct_Props()
    //      Begin a horizontal grouping of widgets.
    //      Create_Option_Line() will force subsequent widget
    //      creation to take place from left to right until
    //      the next call to Create_Option_Line() begins a new
    //      "line".
    Options_Callouts.Create_Option_Line();
    if (is an OPT-arg) then
        //      Draw a line to separate options from command
        //      arguments. Since the OPT-arg node is last on
        //      the list, and there's at most one of them, this
        //      line is drawn after all the options and before
        //      the arguments (if any).
        Options_Callouts.Create_Separator_Line();
    else
        my_ui_handle = Options_Callouts.Create_Checkbox();
        //      The above call also creates a corresponding
        //      label (using the value in the name field of the
        //      OPT node) for the created checkbox.
    endif;

if (SUB is not NULL) then
        SUB->Construct_Props();
    endif;
end Construct_Props;

OPT::Destroy_Props()
    if (SUB is not NULL) then
        SUB->Destroy_Props();
    endif;
    delete local widgets;
end Destroy_Props;

OPT::Display_Props(int loopindex)
    if (not an OPT-ARG node) then
        Options_Callouts.Set_Checkbox(active);
    endif;
    if (SUB is not NULL) then
        SUB->Display_Props(0);
        if (active) then
            SUB->Activate(NULL);
        else
            SUB->Inactivate(NULL);
        endif;
    endif;
end Display_Props;

boolean
OPT::Apply_Props(int loopindex)
    boolean status = FALSE;
```

4

```
    if (not an OPT-arg) then
        active = Options_Callouts.Get_Checkbox();
    endif;
    if (SUB is not NULL) then
        status = SUB->Apply_Props(0);
    endif;
    return status;
end Apply_Props;

OPT::Activate(Widget ui_handle)
    Widget ui = ui_handle;

//    A NULL ui_handle means activate me unconditionally
    if (ui is NULL) then
        activate local widgets;
    endif;
    //    if the ui_handle is a widget belonging to this node,
    //    activate all my suboptions (if any).
    if (ui is same as my_ui_handle) then
        //       Pass NULL to all my suboptions
        ui = NULL;
    endif;
    if (SUB is not NULL) then
        SUB->Activate(ui);
    endif;
end Activate;

OPT::Inactivate(Widget ui_handle)
    Widget ui = ui_handle;

//    A NULL ui_handle means gray me out unconditionally
    if (ui is NULL) then
        inactivate local widgets;
    endif;
    //    if the ui_handle is a widget belonging to this node,
    //    gray out all my suboptions (if any).
    if (ui is same as my_ui_handle) then
        //       Pass NULL to all my suboptions
        ui = NULL;
    endif;
    if (SUB is not NULL) then
        SUB->Inactivate(ui);
    endif;
end Inactivate;

boolean
OPT::Parse_Command(int loopindex)
    boolean temp;

reset pointer to start of command buffer;
    active = FALSE;
    if (SUB is not NULL) then
        if (is an OPT-arg) then
            temp = SUB->Parse_Command(0);
        else
            search the command buffer for this option;
            if (search was successful) then
```

```
                        remove option name from command buffer
                        active = TRUE;
                        //    Go parse my suboptions
                        temp = SUB->Parse_Command(0);
                endif;
            endif;
        endif;
        if (is an OPT-arg node) then
            active = TRUE;
        endif;
        return FALSE;
end Parse_Command;

OPT::Construct_Command(int loopindex, char* buffer)
    // There are 5 command buffers defined for building UNIX
    // commands:
    //      internal_args  - options that do not appear in the
    //                       final command
    //      before_args    - options that must appear
    //                       before any argument
    //      the_args       - the command arguments
    //      after_args     - options that must appear after
    //                       any argument
    //      last_arg       - an option that must be last on
    //                       the command line
    // Each option specifies its position by means of an
    // attribute.  The default is "before_args".
    if (active) then
        choose appropriate command buffer to write into
        if (is NOT an OPT-ARG node) then
            append space character to buffer;
            append option string to buffer;
        endif;
        if (SUB is not NULL) then
            SUB->Construct_Command(0, buffer);
        endif;
    endif;
end Construct_Command;

---------
LIT class
---------

Since a literal is needed by a command line, but not for the
GUI, many of the LIT functions do nothing.

LIT::Construct_Props()
end Construct_Props;

LIT::Destroy_Props()
end Destroy_Props;

LIT::Display_Props(int loopindex)
end Display_Props;

boolean
LIT::Apply_Props(int loopindex)
```

```
        return FALSE;
end Apply_Props;

LIT::Activate(Widget ui_handle)
end Activate;

LIT::Inactivate(Widget ui_handle)
end Inactivate;

boolean
LIT::Parse_Command(int loopindex)
    if (whitespace) then
        remove space character(s) from buffer;
    endif;
    if (literal string is in command buffer) then
        remove the literal string from the command buffer
        return FALSE;
      else
            return TRUE;    //   Error condition
      endif;
end Parse_Command;

LIT::Construct_Command(int loopindex, char* buffer)
    if (whitespace) then
        append space character to buffer;
    endif;
    append literal string to buffer
end Construct_Command;

---------
SUB class
---------
```

The SUB class is a method for handling lists and loops. It contains a single list which may be processed zero, one, or several times depending on the "loopdef" variable. Loopdef may be ZERO_OR_ONE ([]), ZERO_OR_MORE ([]*), ONE_OR_MORE ([]+), or TOP_ONE (no loop, just process the list once). There is also a "loopcount" variable describing how many times the loop was actually processed (i.e. the number of list repetitions for which the user entered values; loopcount is one if loopdef is TOP_ONE). The loopcount field is set when data from the widgets is saved into IDS 13 (i.e. during Apply_Props) and when data obtained from parsing a stored command string is read into IDS 13 (i.e. during Parse_Command).

A SUB node has to "process" its sublist and it has to keep track of how many times it should/does process its sublist.

```
SUB::Construct_Props()
    case (loopdef) is
      ZERO_OR_ONE:
         //    See OPT::Construct_Props() for a description of
               Create_Option_Line()
         Options_Callouts.Create_Option_Line();
         my_ui_handle = Options_Callouts.Create_Checkbox();
      ZERO_OR_MORE:
```

```
            Options_Callouts.Create_Option_Line();
            my_ui_handle = Options_Callouts.Create_Checkbox();
            Options_Callouts.Create_Scrolling_List();
          ONE_OR_MORE:
            Options_Callouts.Create_Option_Line();
            my_ui_handle =
            Options_Callouts.Create_Scrolling_List();
        end case;
        for (each node on my list) do
            node->Construct_Props();
        endloop;
end Construct_Props;

SUB::Destroy_Props()
    for (each node on my list) do
        node->Destroy_Props();
    endloop;
    delete local widgets;
end Destroy_Props;

SUB::Display_Props(int loopindex)
    int loop_cnt;

case (loopdef) is
      ZERO_OR_ONE:
      ZERO_OR_MORE:
        Options_Callouts.Set_Checkbox(loopcount > 0);
    end case;

loop_cnt = loopcount;
    if loop_cnt is 0 then loop_cnt = 1;

for (i = 0; i < loop_cnt; ++i) do
        for (each node on my list) do
            node->Display_Props(i);
            if (loopcount > 0) then
                node->Activate(NULL);
            else
                node->Inactivate(NULL);
            endif;
        endloop;
    endloop;
end Display_Props;

boolean
SUB::Apply_Props(int loopindex)
    boolean apply_failed;
    boolean result = FALSE;
    boolean done = FALSE;

case (loopdef) is
      ZERO_OR_ONE:
      ZERO_OR_MORE:
        If (not Options_Callouts.Get_Checkbox() ) then
            return FALSE;
        endif;
    end case;
```

8

```
loopcount = 0; // we're going to count successful iterations
while (not done) do
    for (each node on my list) do
        apply_failed = node->Apply_Props(loopcount);
        if (apply_failed) then
            done = TRUE;
            case (loopdef) is
               ZERO_OR_ONE:
               ZERO_OR_MORE:
                   //   Okay if not found (that's what ZERO means)
               ONE_OR_MORE:
               TOP_ONE:
                   result = TRUE;
            end case;
        endif;
    endloop;
    if (not done) then
        loopcount = loopcount + 1;
        case (loopdef) is
          ZERO_OR_ONE:
          TOP_ONE:
              done = TRUE;
          ZERO_OR_MORE:
          ONE_OR_MORE:
              //   Keep looping until parse fails (that's what
              //   OR_MORE means)
        endcase;
    endif;
endloop;
return result;
end Apply_Props;

SUB::Activate(Widget ui_handle)
    Widget ui = ui_handle;

if (ui is NULL) then
        activate local widgets
        case (loopdef) is
           ZERO_OR_ONE:
           ZERO_OR_MORE:
               if ( not Options_Callouts.Get_Checkbox() ) then
                       //    Stop activating. The subexpr is not
                       //    checked and should remain inactive
                       return;
               endif;
        endcase;
    endif;
    if (ui is same as my_ui_handle) then
        //    Pass NULL to all my suboptions
        ui = NULL;
    endif;
    for (each node on my list) do
        node->Activate(ui);
        if (ui is not NULL and ui is the same as node-
        >my_ui_handle) then
```

```
                    //      Stop processing after the node matching
                    //      the ui_handle is processed.  The rest of
                    //      the linked list isn't relevant.
                return;
            endif;
        endloop;
end Activate;

SUB::Inactivate(Widget ui_handle)
    Widget ui = ui_handle;

if (ui is NULL) then
        inactivate local widgets
    endif;
    if (ui is same as my_ui_handle) then
        // Pass NULL to all my suboptions
        ui = NULL;
    endif;
    for (each node on my list) do
        node->Inactivate(ui);
        if (ui is not NULL and ui is the same as node-
        >my_ui_handle) then
                    //      Stop processing after the node matching
                    //      the ui_handle is processed.  The rest of
                    //      the linked list isn't relevant.
                return;
            endif;
        endloop;
end Inactivate;

boolean
SUB::Parse_Command(int loopindex)
    boolean parse_failed;
    boolean result = FALSE;
    boolean done = FALSE;
    if (whitespace) then
        remove space character(s) from buffer;
    endif;

loopcount = 0;  //   we're going to count successful
                    //   iterations
    while (not done) do
        for (each node on my list) do
            parse_failed = node->Parse_Command(loopindex);
            if (parse_failed) then
                done = TRUE;
                case (loopdef) is
                  ZERO_OR_ONE:
                  ZERO_OR_MORE:
                    //   Okay if not found (that's
                    //   what ZERO means)
                  ONE_OR_MORE:
                  TOP_ONE:
                    result = TRUE;
                end case;
            endif;
        endloop;
```

```
            if (not done) then
                loopcount = loopcount + 1;
                loopindex = loopindex + 1;
                case (loopdef) is
                  ZERO_OR_ONE:
                  TOP_ONE:
                    done = TRUE;
                  ZERO_OR_MORE:
                  ONE_OR_MORE:
                    //  Keep looping until parse fails
                    //  (that's what OR_MORE means)
                endcase;
            endif;
      endloop;
      return result;
end Parse_Command;

SUB::Construct_Command(int loopindex, char *buffer)
    if (loopcount is 0) then
        return;
    endif;
    if (whitespace) then
        append space character to buffer;
    endif;
    for (each node on my list) do
        node->Construct_Command(loopindex, buffer);
    endloop;
end Construct_Command;

---------
ID class
---------
ID::Construct_Props()
   Options_Callouts.Create_Label();
   if (has single value) then
       if (is a file type) then
           Options_Callouts.Create_File_TextField();
         else
           Options_Callouts.Create_TextField();
       endif;
     else
         Options_Callouts.Create_Exclusive_Choice();
     endif;
end Construct_Props;

ID::Destroy_Props()
    delete local widgets;
end Destroy_Props;

ID::Display_Props(int loopindex)
   if (not an enumerated type) then
       if (is a file type) then
           Options_Callouts.Set_File_TextField
           (value[loopindex]);
         else
           Options_Callouts.Set_TextField
           (value[loopindex]);
```

```
                endif;
        else
                Options_Callouts.Set_Exclusive_Choice
                (value[loopindex]);
        endif;
end Display_Props;

boolean
ID::Apply_Props(int loopindex)
     if (not an enumerated type) then
          if (is a file type) then
               value[loopindex] =Options_Callouts.
               Get_File_TextField();
          else
               value[loopindex] =Options_Callouts.
               Get_TextField();
          endif;
     else
          value[loopindex] = Options_Callouts.
          Get_Exclusive_Choice();
     endif;
     if (value[loopindex]) is NULL) then
          return TRUE;                    //    No value
     else
          return FALSE;
     endif;
end Apply_Props;

ID::Activate(Widget ui_handle)
     if (ui_handle is NULL) then
          activate local widgets
     endif;
end Activate;

ID::Inactivate(Widget ui_handle)
     if (ui_handle is NULL) then
          inactivate local widgets
     endif;
end Inactivate;

boolean
ID::Parse_Command(int loopindex)
     if (whitespace) then
          remove space character(s) from buffer;
     endif;
     if (identifier is in command buffer) then
          value[loopindex] = identifier from command buffer
          remove the identifier from the command buffer
          return FALSE;
      else
              return TRUE;    //    Error condition
      endif;
end Parse_Command;

ID::Construct_Command(int loopindex, char* buffer)
     if (whitespace) then
          append space character to buffer;
```

12

```
      endif;
      append value[loopindex] to buffer
end Construct_Command;
```

What is claimed is:

1. A computer-implemented method for specifying a graphical user interface of an application, the method comprising:

creating a first entity definition defining a structure of a first entity;

storing the first entity definition in an input file for the application, the application including a set of callback routines;

editing the input file in order to add or modify the first entity definition; and during execution of the application, creating a first graphical user interface that permits a user to create or modify instances of the first entity definition independent of modification to the set of callback routines, wherein said step of creating a first graphical user interface comprises the steps of:

accessing the input file and parsing the first entity definition to produce a corresponding internal format;

accessing the internal format, to determine the set of graphical elements of the first graphical user interface; and creating the set of graphical elements of the first graphical user interface.

2. The method of claim 1, wherein the first entity is a shell command of the UNIX operating system and the first entity definition describes arguments or options for the shell command.

3. The method of claim 1, further comprising the steps of:

receiving input from the user, the input providing values for one or more of the graphical elements;

saving the values for the one or more of the graphical elements into the internal format; and creating an instance of the first entity, the instance corresponding to the internal format.

4. The method of claim 1, further comprising the steps of:

copying data from an instance of the first entity into the internal format; and copying the data from the internal format into one or more of the graphical elements.

5. The method of claim 4, wherein the instance of the first entity is retrieved from a storage device.

6. The method of claim 1, wherein the step of parsing can be triggered by user input during execution of the application.

7. The method of claim 1, wherein the step of parsing is performed when the application begins to execute.

8. The method of claim 1, further comprising the steps of:

creating a second entity definition defining a structure of a second entity;

adding the second entity definition to the input file; and during execution of the application, creating a second graphical user interface that permits the user to create or modify instances of the second entity independent of modification to the set of callback routines.

9. The method of claim 8, wherein:

each of the callback routines being executed upon the occurrence of a respective interaction between the user and a graphical element; and performing the step of creating a second graphical user interface.

10. The method of claim 1, further comprising the steps of:

changing the first entity definition of the input file, the changed entity definition defining a structure of a second entity; and during execution of the application, creating a second graphical user interface that permits the user to create or modify instances of the second entity.

11. The method of claim 10, wherein:

each of the callback routines being executed upon the occurrence of a respective interaction between the user and a graphical element; and performing the step of creating a second graphical user interface.

12. The method of claim 1, wherein the first entity definition includes an attribute that affects the first graphical user interface.

13. The method of claim 1, wherein the first entity definition includes an attribute that affects the instances of the first entity created by the user via the first graphical user interface.

14. A computer-implemented method for specifying a graphical user interface of an application, the method comprising:

creating a first command definition defining a structure of a first command;

storing the first command definition in an input file for the application, the application including a set of callback routines;

editing the input file in order to add or modify the first command definition; and during execution of the application, creating a first graphical user interface that permits a user to create or modify instances of the first command independent of modification to the set of callback routines, wherein said step of creating a first graphical user interface comprises the steps of:

accessing the input file and parsing the first entity definition to produce a corresponding internal format;

accessing the internal format, to determine the set of graphical elements of the first graphical user interface; and creating the set of graphical elements of the first graphical user interface.

15. The method of claim 14, wherein the first command is a shell command of the UNIX operating system and the first command definition describes arguments or options for the shell command.

16. The method of claim 14, further comprising the steps of:

receiving input from the user, the input providing values for one or more of the graphical elements;

saving the values for the one or more of the graphical elements into the internal format; and creating an instance of the first command, the instance corresponding to the internal format.

17. The method of claim 14, further comprising the steps of:

copying data from an instance of the first command into the internal format; and copying the data from the internal format into one or more of the graphical elements.

18. The method of claim 14, further comprising the steps of:

creating a second command definition defining a structure of a second command;

adding the second command definition to the input file; and during execution of the application, creating a second graphical user interface that permits the user to create or modify instances of the second command.

19. The method of claim 18, wherein:

each of the callback routines being executed upon the occurrence of a respective interaction between the user and a graphical element; and performing the step of creating a second graphical user interface.

20. The method of claim 14, further comprising the steps of:

changing the first command definition of the input file, the changed command definition defining a structure of a second command; and during execution of the application, creating a second graphical user interface that permits the user to create or modify instances of the second command.

21. The method of claim 20, wherein:

each of the callback routines being executed upon the occurrence of a respective interaction between the user and a graphical element; and performing the step of creating a second graphical user interface.

22. The method of claim 14, wherein the first command definition includes an attribute that affects the execution of the instances of the first command created by the user via the first graphical user interface.

23. A computer program product for specifying a graphical user interface of an application, the product comprising:

code for creating a first entity definition defining a structure of a first entity;

code for storing the first entity definition in an input file for the application;

code for editing the input file in order to add or modify the first entity definition;

code for creating, during execution of the application, a first graphical user interface that permits a user to create or modify instances of the first entity independent of modification to the set of callback routines, wherein said code for creating a first graphical user interface comprises code for accessing the input file, code for parsing the first entity definition to produce a corresponding internal format, code for accessing the internal format, to determine the set of graphical elements of the first graphical user interface, and code for creating the set of graphical elements of the first graphical user interface; and a computer-readable storage medium that stores the code.

24. The product of claim 23, wherein the first entity is a shell command of the UNIX operating system and the first entity definition describes arguments or options for the shell command.

25. The product of claim 23, further comprising:

code for receiving input from the user, the input providing values for one or more of the graphical elements;

code for saving the values for the one or more of the graphical elements into the internal format; and code for creating an instance of the first entity, the instance corresponding to the internal format.

26. The product of claim 23, further comprising:

code for copying data from an instance of the first entity into the internal format; and code for copying the data from the internal format into one or more of the graphical elements.

27. The product of claim 23, further comprising:

code for creating a second entity definition defining a structure of a second entity;

code for adding the second entity definition to the input file; and code for creating, during execution of the application, a second graphical user interface that permits the user to create or modify instances of the second entity.

28. The product of claim 27, wherein:

each of the callback routines being executed upon the occurrence of a respective interaction between the user and a graphical element; and creation of a second graphical user interface.

29. The product of claim 23, further comprising:

code for changing the first entity definition of the input file, the changed entity definition defining a structure of a second entity; and code for creating, during execution of the application, a second graphical user interface that permits the user to create or modify instances of the second entity.

30. The product of claim 29, wherein:

each of the callback routines being executed upon the occurrence of a respective interaction between the user and a graphical element; and creation of a second graphical user interface.

31. A computer program product for specifying a graphical user interface of an application, the product comprising:

code for creating a first command definition defining a structure of a first command;

code for storing the first command definition in an input file for the application, the application including an operations code;

code for editing the input file in order to add or modify the first command definition;

code for creating, during execution of the application, a first graphical user interface that permits a user to create or modify instances of the first command definition independent of modification to the operations code, wherein said code for creating a first graphical user interface comprises code for accessing the input file, code for parsing the first entity definition to produce a corresponding internal format, code for accessing the terminal format, to determine the set of graphical elements of the first graphical user interface, and code for creating the set of graphical elements of the first graphical user interface; and a computer-readable storage medium that stores the code.

32. The product of claim 31, wherein the first command is a shell command of the UNIX operating system and the first command definition describes arguments or options for the shell command.

33. The product of claim 31, further comprising:

code for receiving input from the user, the input providing values for one or more of the graphical elements;

code for saving the values for the one or more of the graphical elements into the internal format; and code for creating an instance of the first command, the instance corresponding to the internal format.

34. The product of claim 31, further comprising:

code for copying data from an instance of the first command into the internal format; and code for copying the data from the internal format into one or more of the graphical elements.

35. The product of claim 31, further comprising:

code for adding a second command definition to the input file, the second command definition defining a structure of a second command; and code for creating, during execution of the application, a second graphical user interface that permits the user to create or modify instances of the second command.

36. The product of claim 35, wherein:

each of the callback routines being executed upon the occurrence of a respective interaction between the user and a graphical element; and creation of a second graphical user interface.

37. The product of claim 31, further comprising:

code for changing the first command definition of the input file, the changed command definition defining a structure of a second command; and code for creating, during execution of the application, a second graphical user interface that permits the user to create or modify instances of the second command.

38. The product of claim 37, wherein:

each of the callback routines being executed upon the occurrence of a respective interaction between the user and a graphical element; and creation of a second graphical user interface.

39. A computer system for specifying a graphical user interface of an application, the system comprising:

a first storage medium storing an input file for the application, the application including a set of callback routines, the input file containing a first entity definition, the first entity definition defining a structure of a first entity, wherein the input file can be edited in order to add or modify entity definitions; and a processor configured to create, during execution of the application, a first graphical user interface that permits a user to create or modify instances of the first entity independent of modification to the set of callback routines, wherein said processor is configure to access the input file, parse the first entity definition to produce a corresponding internal format, access the internal format, to determine the set of graphical elements of the first graphical user interface, and create the set of graphical elements of the first graphical user interface.

40. A computer system for specifying a graphical user interface of an application, the system comprising:

a first storage medium storing an input file for the application, the application including a set of callback routines, the input file containing a first command definition, the first command definition defining a structure of a first command, wherein the input file can be edited in order to add or modify command definitions; and a processor configured to create, during execution of the application, a first graphical user interface that permits a user to create or modify instances of the first command independent of modification to the set of callback routines, wherein said processor is configured to access the input file, parse the first entity definition to produce a corresponding internal format, access the internal format, to determine the set of graphical elements of the first graphical user interface, and create the set of graphical elements of the first graphical user interface.

* * * * *